United States Patent
Itou et al.

(10) Patent No.: US 7,051,461 B2
(45) Date of Patent: May 30, 2006

(54) WALK-BEHIND WORKING MACHINE

(75) Inventors: Tomoki Itou, Wako (JP); Hiromi Yuzuriha, Wako (JP); Ai Amano, Wako (JP); Seishu Sakai, Wako (JP); Masatoshi Nagaoka, Wako (JP); Takahiro Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/875,110

(22) Filed: Jun. 23, 2004

(65) Prior Publication Data

US 2005/0039355 A1   Feb. 24, 2005

(30) Foreign Application Priority Data

| Aug. 21, 2003 | (JP) | ............................. 2003-297986 |
| Aug. 21, 2003 | (JP) | ............................. 2003-297995 |
| Aug. 21, 2003 | (JP) | ............................. 2003-297999 |
| Aug. 21, 2003 | (JP) | ............................. 2003-298029 |

(51) Int. Cl.
*E01H 4/00* (2006.01)
*E01H 5/09* (2006.01)

(52) U.S. Cl. .............................. 37/219; 37/246; 37/249

(58) Field of Classification Search .................. 37/219, 37/237, 246, 249
See application file for complete search history.

(56) References Cited

U.S. PATENT DOCUMENTS

| 5,867,926 | A | * | 2/1999 | Schmitt ........................ 37/227 |
| 6,453,583 | B1 | * | 9/2002 | Hanafusa et al. ............. 37/246 |
| 6,470,603 | B1 | * | 10/2002 | Hanafusa et al. ............. 37/257 |
| 6,834,448 | B1 | * | 12/2004 | Hanafusa ....................... 37/223 |
| 6,944,979 | B1 | * | 9/2005 | Hanafusa et al. ............. 37/260 |

FOREIGN PATENT DOCUMENTS

| JP | 63118409 | 5/1988 |
| JP | 11013036 | 1/1999 |
| JP | 00170132 | 6/2000 |

* cited by examiner

*Primary Examiner*—Thomas A. Beach
(74) *Attorney, Agent, or Firm*—Adams & Wilks

(57) ABSTRACT

A walk-behind working machine has a traveling unit, a working unit, an engine, and an illumination section disposed forwardly of the engine for projecting light. A cover member collectively covers the engine and the illumination section. The cover member has a light transmitting section for transmitting therethrough light projected by the illumination section. The light transmitting section or a portion of the cover member near the light transmitting section has at least one through-hole through which heat generated by at least one of the engine and the illuminating section is radiated.

20 Claims, 26 Drawing Sheets

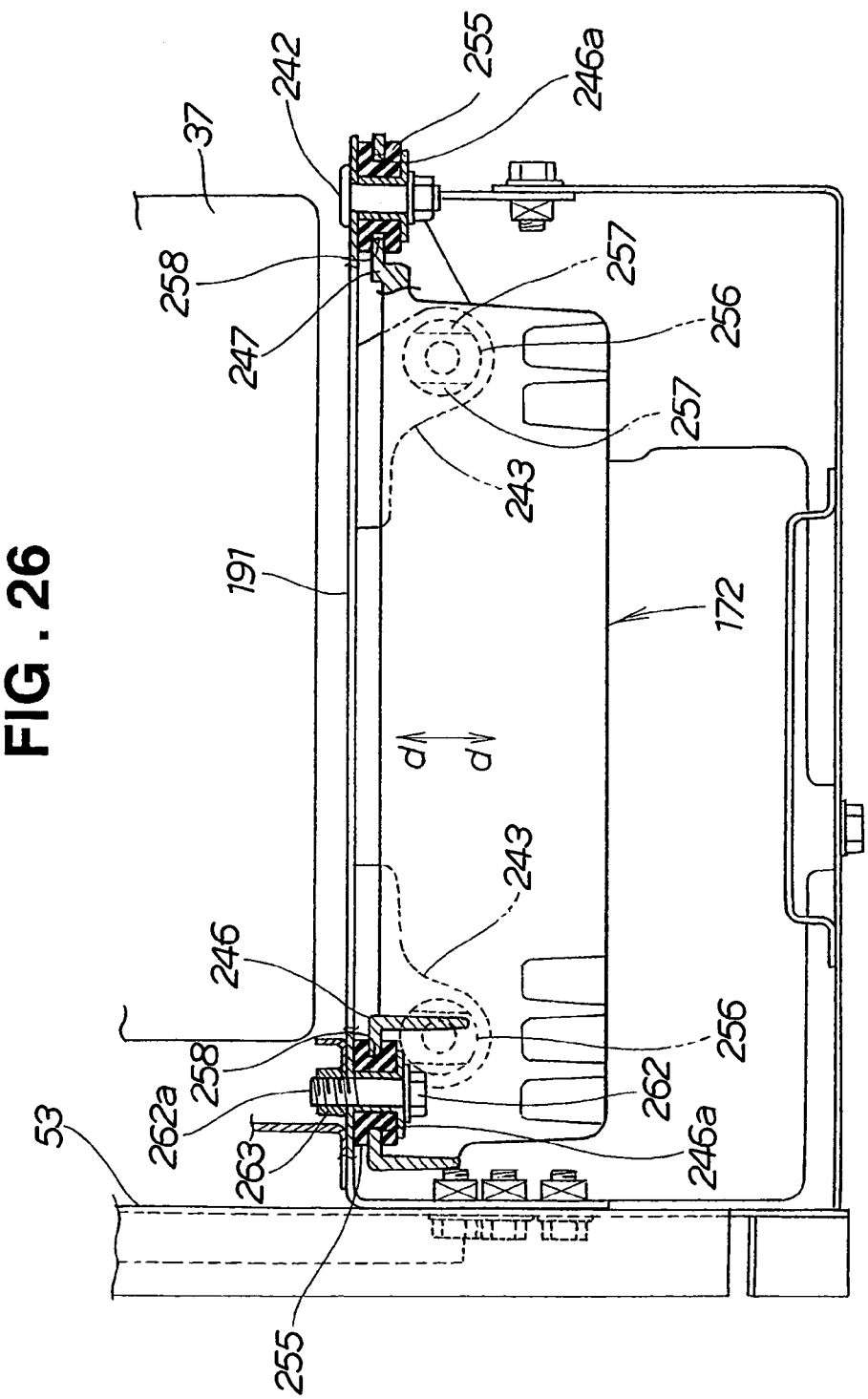

WALK-BEHIND WORKING MACHINE

BACKGROUND OF THE INVENTION

Field of the Invention

The present invention relates to a walk-behind working machine, such as a snow removing machine, which is provided with an illumination section for illuminating an area in front of the machine. The present invention also relates to a battery support structure employed in the walk-behind working machine and including a battery holder into which a battery can be inserted from above or sideways and a battery locking member for holding the upper surface of the battery inserted in the battery holder. The present invention further relates to a small-size snow removing machine which includes an auger housing, blower housing, battery and illumination section.

BACKGROUND INFORMATION

Examples of the known walk-behind working machines include snow removing machines which are arranged to gather snow via an auger, throw up the gathered snow via a blower and discharges the thrown-up snow via a shooter. Of such snow removing machines, there have been known ones where an illumination section is mounted on an upper portion of a cover that covers an engine etc. (e.g., Japanese Patent Laid-Open Publication No. HEI-11-13036). With the illumination section provided on the upper portion of the cover, a human operator can secure a good front field of view, i.e. field of view around the auger, when doing snow removing work at night or in a dark place, so that a working load on the human operator can be reduced considerably. However, the illumination section mounted on the upper portion of the cover would be exposed to wind and rain, thus resulting in a short life. If the illumination section too is covered with a separate cover in order to increase the life of the illumination section, the number of necessary components of the machine would increase, thereby preventing simplification of assembling operations.

Further, Japanese Patent Laid-Open Publication No. SHO-63-118409 discloses a snow removing machine of the above-mentioned type, which includes a battery for powering various electric equipment employed in the machine and a battery support structure. In installing the battery, the battery is placed on a transmission case between a pair of stud bolts partly inserted in the transmission case, and a battery locking member is placed on the upper surface of the battery with respective upper end portions of the stud bolts inserted through corresponding through-holes formed in opposite end portions of the battery locking member. Then, nuts are screwed onto the upper end portions of the stud bolts to thereby press the opposite end portions of the battery locking member against the transmission case. In this way, the battery can be fixedly installed with its upper end held by the locking member. However, because the nuts have to be screwed onto the pair of stud bolts in the disclosed conventional battery support structure, attaching/detaching the battery would require a considerable amount of time and labor. Further, because the locking member is removed from the stud bolts when the battery is to be detached, it tends to get lost easily. Besides, where the locking member is formed of metal, the mounting position of the battery locking member would be greatly limited in order to avoid contact between terminals of the battery and the locking member and thereby prevent a short circuit. Further, a resin coating has to be formed on the surface of the locking member in order to avoid the short circuit.

Further, Japanese Patent Application Laid-Open Publication No. 2000-170132 discloses a snow removing machine provided with an illumination section, which also includes an engine mounted on a machine body for driving the auger, blower etc., an auger housing having an auger accommodated therein, a battery mounting bed secured to a rear portion of the auger housing beside the shooter, and a battery case mounted on the battery mounting bed for accommodating therein a battery. The battery is securely held on the mounting bed by means of a battery holding plate connected to and extending between the upper ends of opposed support members extending upward from the mounting bed. Also, in the disclosed snow removing machine, the illumination section is mounted on a stay secured to one of left and right operating handles extending rearward from the machine body, and the illumination section projects light to illuminate an area in front of the machine. However, because this requires the support members and holding plate for holding the battery on the mounting bed as well as the stay for mounting the illumination section, the number of the necessary components of the machine increases, which would prevent reduction in the cost of the machine. Further, because the battery is held rearwardly of the auger housing and the illumination section is mounted via the stay on the left or right operating handle, the battery and illumination section are spaced a great distance from each other, which would make it difficult to secure a sufficient space for laying a harness (wires) for the illumination section and thereby result in a lowered design freedom.

Further, in the snow removing machine disclosed in the No. 2000-170132 publication, a battery cover is mounted over the battery held on the mounting bed for protecting an upper end portion of the battery from snow and/or rain. However, there is still a possibility of snow and/or rain, having adhered to side wall surfaces of the battery, undesirably entering a gap between the battery and the battery cover to reach the upper end portion of the battery. The same cover covering the engine may be extended to cover the entire battery in order to avoid the inconvenience, in which case, however, heat produced form the engine tends to transfer to the battery and adversely influence the battery.

SUMMARY OF THE INVENTION

In view of the foregoing prior art problems, it is an object of the present invention to provide a walk-behind working machine which is arranged to appropriately protect an illumination section from wind and rain without requiring an increase in the number of necessary components.

It is another object of the present invention to provide a battery support structure for a walk-behind working machine which allows a battery to be readily attached and detached to and from a body of the machine without requiring a considerable amount of time and labor, which can prevent loss of a battery locking member, which allows a mounting position of the locking member to be chosen or determined relatively freely, and which can eliminate a need to form a resin coating on the surface of the locking member.

It is still another object of the present invention to provide a walk-behind working machine which permits mounting of a battery and illumination section with a reduced number of components and which can be constructed with an enhanced design freedom.

It is still another object of the present invention to provide a walk-behind working machine which is arranged to reliably protect a battery from snow and/or rain and prevent the battery from being adversely influenced by hear produced from the engine.

According to one aspect of the present invention, the present invention provides a walk-behind working machine which comprises: a traveling unit; a working unit; an engine; an illumination section disposed forwardly of the engine, the traveling unit, working unit, engine and illumination section being supported by a machine body; and a cover member collectively covering the engine and illumination section and including a light transmitting section for passing therethrough light projected by the illumination section. A through-hole for letting out hot air to escape from within the cover member is formed in the light transmitting section or other portion of the cover member near the light transmitting section.

With the cover member covering the illumination section, the illumination section can be reliably protected from wind and rain and thus can have a longer life. Further, because the illumination section is covered with the same cover member as the engine, there is no need to provide a separate cover for the illumination section, which therefore can avoid an increase in the number of the components of the working machine and simplify the assembly steps of the working machine. In the case where the engine and illumination section are covered with the same cover member, heat (hot air) produced from the illumination section might undesirably gather or pile up within the cover member. Thus, there is a possibility of the heat adversely influencing the engine and evaporating moisture within the cover member so that the light transmitting section gets cloudy. To avoid such an inconvenience, the through-hole is formed in either the light transmitting section or other portion of the cover member located near the light transmitting section so that heat, produced from the illumination section, is allowed to effectively escape from within the cover member without piling up within the cover member. As a result, the present invention can prevent the engine from being adversely influenced by the heat produced from the illumination section and also prevent the light transmitting section from getting cloudy due to evaporation, by the heat, of moisture within the cover member.

In one embodiment, the walk-behind working machine further comprises an eave portion that extends from the light transmitting section or other portion of the cover member to cover the through-hole and thereby prevent rain water from entering the through-hole With the eave portion covering the through-hole, the illumination section can be reliably protected form rain water. The eave portion, extending forward from either a given portion of the cover member or the light transmitting section, the eave portion can be used as a handle in attaching/detaching the cover member, so that there is no need to provide a separate handle for attaching/detaching the cover member.

In one preferred implementation, the eave portion is formed integrally with and extends from the light transmitting section, and a portion of light projected from the illumination section reaches and scatters from the eave portion as it passes through the transmitting section. The light scattering from the eave portion lights up the eave portion, which makes it easier for the human operator to look at the eave portion. Namely, with the eave portion thus lighted up and extending to a position viewable by the human operator walking behind an ordinary operating position, the human operator can readily visually ascertain an ON/OFF state of the illumination section by just looking at the eave portion from the ordinary operating position.

In one preferred embodiment, the walk-behind working machine is arranged as a snow removing machine, which comprises: an auger housing and blower housing disposed in front of the machine body; a battery disposed on the blower housing; and an illumination section disposed over the battery. Because the illumination section is provided over the battery, the battery holding plate heretofore required for holding the battery and the stay heretofore required for holding the illumination section can be constructed as a common member in the present invention. Thus, the present invention can advantageously reduce the number of the necessary components. Further, with the illumination section located near the battery, an illuminating wiring harness connected to the illumination section can be reduced in length. Thus, a space for laying the illuminating wiring harness can be secured relatively easily, which can advantageously contribute to an enhanced design freedom of the machine.

In one embodiment, the snow removing machine of the invention further comprises a battery support structure, which includes: a battery holder mounted on an upper portion of the blower housing; and a battery locking member attached to the battery holder for holding the battery received in the battery holder, the illumination section being mounted on the battery locking member. Because the illumination section is mounted on the battery locking member that holds the battery, the battery locking member can function also as a stay for the illumination section, so that the present invention can even further reduce the number of the necessary components.

In one preferred implementation, the battery locking member is hinged at one end to the battery holder, so that the present invention can prevent a human operator or the like from inadvertently dropping the battery locking member when removing the battery. Thus, it is possible to avoid the illumination section and/or illuminating harness from being damaged by accidental droppage of the battery locking member.

In one embodiment, the battery is inserted in the battery holder from above or sideways, the battery locking member holds the upper surface of the battery received in the battery holder, and the battery locking member is formed of an insulative resin material. The insulative resin material forming the battery locking member can prevent a short circuit when the battery locking member contacts terminals of the battery. Therefore, the mounting position of the battery locking member can be determined relatively freely, without being limited by the presence of the battery terminals. Further, because of the insulative resin material, there is no need to form a resin film or coating on the surface of the battery locking member.

In one embodiment, the battery locking member has a resiliently-deformable flexible portion in or near the middle thereof. By resilient deformation of the flexible region, opposite end portions of the battery locking member can reliably contact the upper surface of the battery. Thus, the battery locking member can firmly hold the battery at its opposite end portions.

In a preferred implementation, the battery locking member is hinged at one end to the battery holder and removably coupled at the other end to the battery holder. Thus, just decoupling the other end of the battery locking member from the battery holder can readily remove the battery from the battery holder. Such an arrangement not only facilitates attachment/detachment of the battery to/from the battery holder, but also prevents loss of the battery locking member.

In a preferred implementation, the battery locking member has, at the other end, abutting surfaces that abut against the upper surface of the battery when the other end is attached to the battery holder. By the provision of the abutting surfaces, the resiliently-deformable flexible portion does not have to be bent greatly to abut against the upper surface of the battery, so that the battery locking member can have a longer life.

In a preferred implementation, the battery locking member has, at the other end, a tapering portion that abuts against an upper corner portion of the battery when the other end is attached to the battery holder. The provision of such a tapering portion allows the battery to be gradually moved toward the one end portion and ultimately positioned at a right location, so that the battery can be held appropriately.

In one embodiment, the battery is disposed in front of the engine, and the battery and engine are covered collectively by the cover member, and a partition wall is disposed between the battery and the engine for blocking heat transferred from the engine toward the battery The cover member covers the entire battery and thereby prevents snow and/or rain from entering the battery through side walls of the battery; thus, the battery can be reliably protected from snow and/or rain, and behavior of the machine can be prevented from being adversely influenced by heat produced from the engine.

In a preferred implementation, the machine further comprises a relay switch for electric equipment driven by the battery, and the relay switch is mounted on the partition wall. Thus, there is no need to provide a separate member for mounting the relay switch, which can contribute further reduction in the number of the necessary components of the machine and in the number of the necessary assembly steps

BRIEF DESCRIPTION OF THE DRAWINGS

Certain preferred embodiments of the present invention will hereinafter be described in detail, by way of example only, with reference to the accompanying drawings, in which:

FIG. 26 is a plan view of the control unit of the snow removing machine of FIG. 14.

DETAILED DESCRIPTION OF THE PREFERRED EMBODIMENTS

The working machine of the present invention will hereinafter be described as embodied as a snow removing machine, although it is not limited to snow removing machines.

Figure 1:
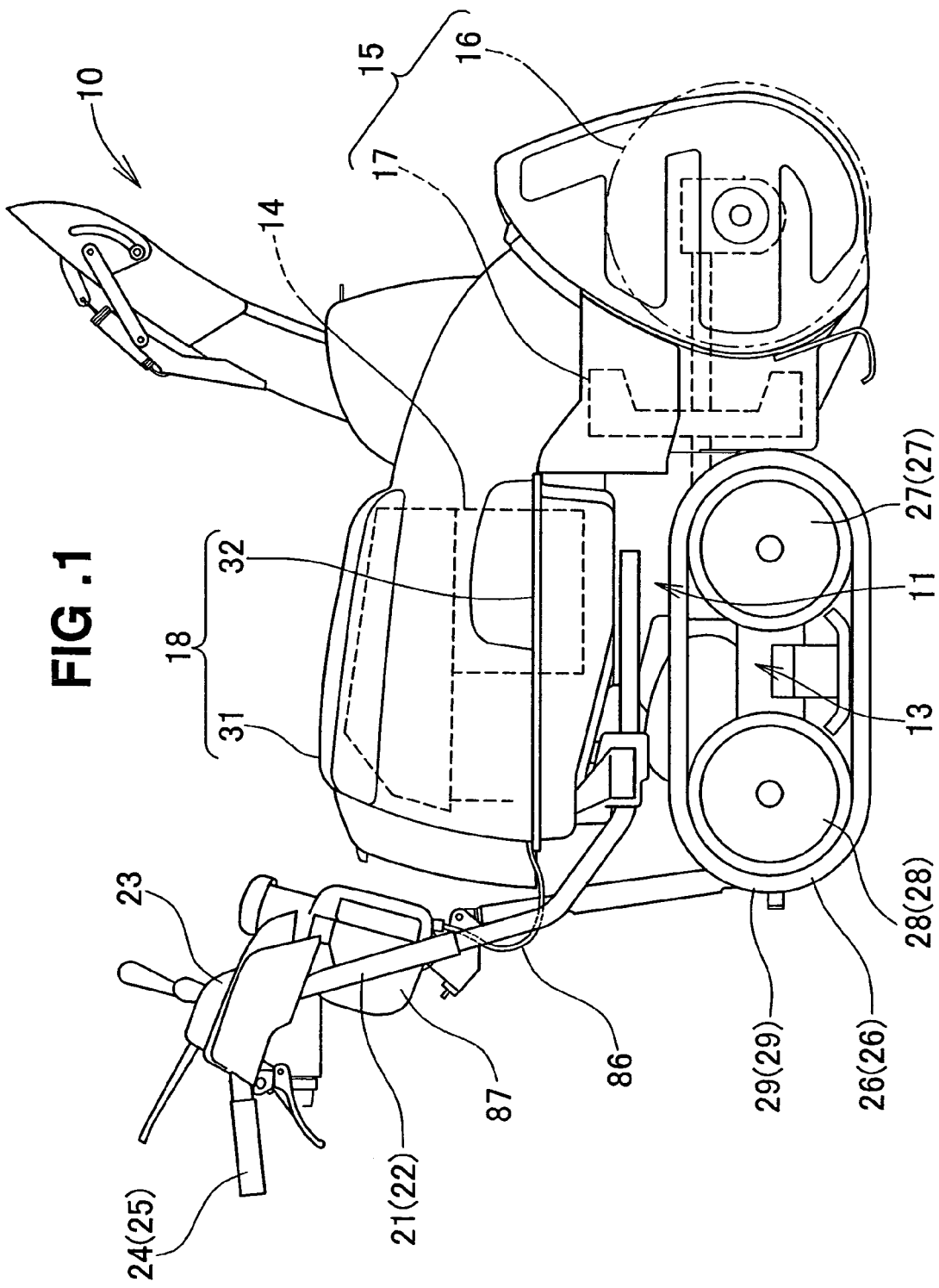
FIG. 1 is a side view of a snow removing machine in accordance with an embodiment of the present invention.

FIG. 1 is a side view of the snow removing machine in accordance with an embodiment of the present invention. The snow removing machine 10, one embodiment of the walk-behind working machine of the present invention, includes left and right electric motors (not shown in the figure; see 112 and 113 in FIG. 14) mounted to the left and right of a transmission case 11 forming a machine body, a traveling unit 13 connected to the left and right electric motors, an engine 14 disposed on the transmission case 11, and a snow removing unit (i.e., working unit) 15 driven by the engine 14 and secured to a front portion of the transmission case 11. Rear portion of the snow removing unit 15 and engine 14 are covered with a cover member 18, and left and right operating handles 21 and 22 extend rearwardly and upwardly from upper portions of the transmission case 11. Operation panel 23 is mounted between the left and right operating handles 21 and 22, and a human operator walks behind the operation panel 23 while holding grips 24 and 25 of the handles 21 and 22.

The traveling unit 13 includes left and right traveling sections 26 located outside the left and right motors (112 and 113), respectively. Note that the left and right traveling sections 26 are constructed identically. Each of the left and right traveling sections 26 includes a left or right driving wheel 27 coupled to the left or right motor, a left or right idling wheel 28 rotatably mounted behind the driving wheel 27, and a left or right crawler belt 29 wound around the corresponding driving and idling wheels 27 and 28. The snow removing unit 15 also includes an auger section 16, a blower section 17, a shooter 19, etc.

In this snow removing machine 10, the left and right drive wheels 27 are driven by the left and right motors to drive the left and right crawler belts 29 so that the machine 10 can be caused to travel. Under this condition, the auger section 16 and blower section 17 are driven by the engine 14 to perform desired snow removing work.

The cover member 18 includes a lower cover section 32 (second cover section) covering a lower portion of the engine 14 and an upper cover section 31 (first cover section) covering an upper portion of the engine 14, so that the entire engine 14 is covered with the upper and lower cover sections 31 and 32 of the cover member 18.

Figure 2:
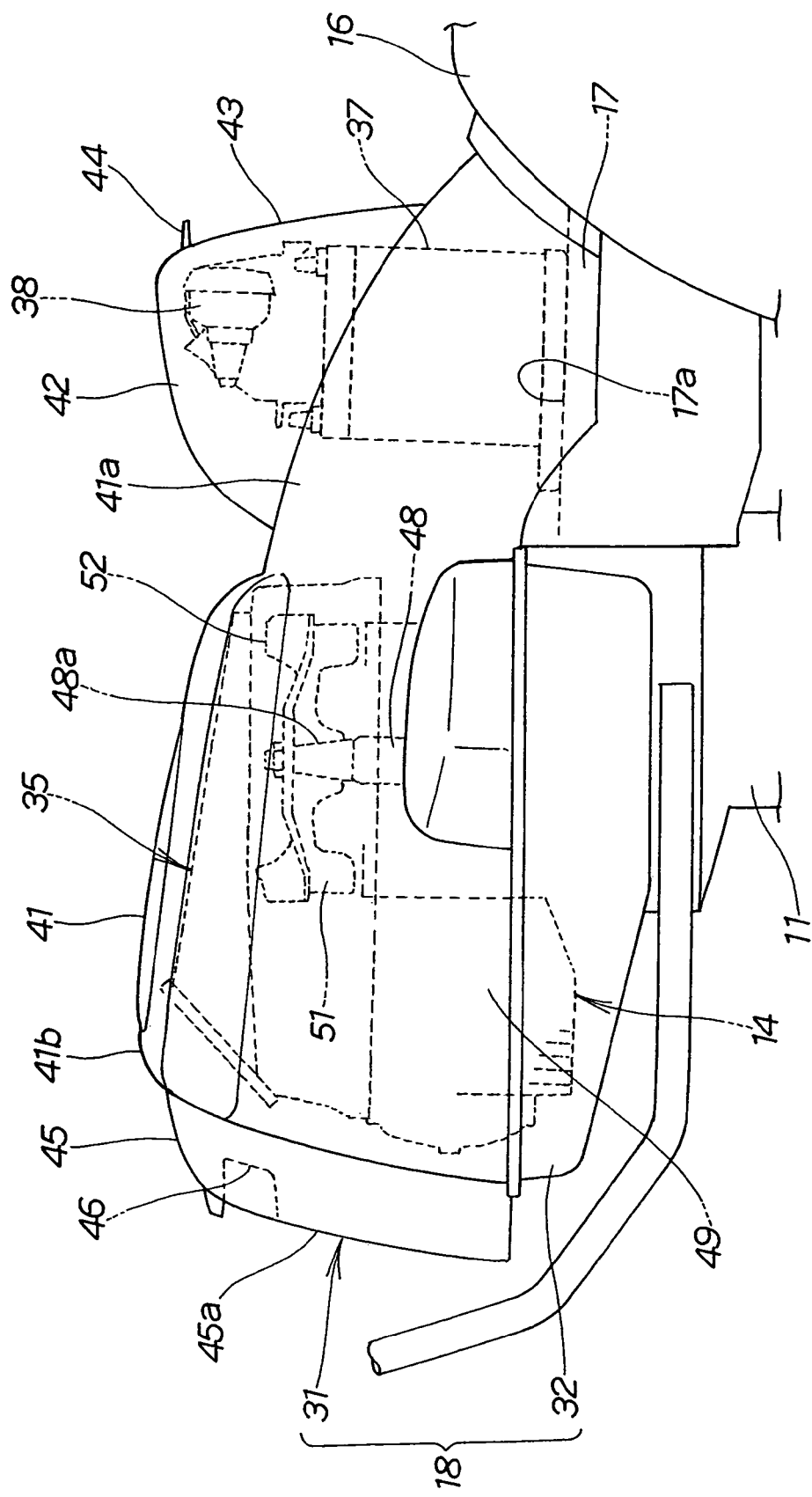
FIG. 2 is a fragmentary expanded view showing important sections of the snow removing machine of the invention.

FIG. 2 is a fragmentary expanded view showing important sections of the snow removing machine of the present invention. As shown, the engine 14 is provided on the transmission case 11, an air duct (shroud) 35 is provided above the engine 14, and the blower and auger sections 17 and 16 are disposed forwardly of the transmission case 11.

Battery 37 is mounted on an upper portion 17a of the blower section 17, and an illumination section 38 is provided over the battery 37 and forwardly of the engine 14.

The lower cover section 32 of the cover member 18 is positioned between the transmission case 11 and the engine 14 so as to cover the lower portion of the engine 14. The upper cover section 31 of the cover member 18 is attached to the upper end edge of the lower cover section 32, so that the same or common cover section 31 collectively covers the engine 14, air duct 35, battery 37 and illumination section 38.

More specifically, the upper cover section 31 includes an upper cover body 41 having a front portion 41a from which a sub-cover portion 42 projects upward and forward. The sub-cover portion 42 has the illumination section 38 accommodated therein, and it has a light transmitting section 43 and a eave portion 44 provided on it's front surface region.

The upper cover body 41 has a rear portion 41b on which a rear cover section 45 is provided, and a handle portion 46 is provided on a rear end portion 45a of the rear cover section 45. The light transmitting section 43 and the rear cover section 45 will be detailed later with reference to FIGS. 3 and 4, respectively.

The engine 14 is a vertical engine, which has a crankshaft 48 oriented in a vertical direction of the snow removing machine 10 and a cylinder block 49 extending rearward. Flywheel 51 is secured to an upper end 48a of the vertical crankshaft 48, and a cooling fan 52 is disposed over the flywheel 51 (see also FIG. 6). The flywheel 51 has a gear portion (not shown) formed on its outer periphery, and a pinion (not shown) of a starter motor meshes with the gear portion.

By rotating the flywheel 51 via the pinion of the starter motor, the crankshaft 48 and cooling fan 52 are rotated together with the flywheel 51. By rotating the crankshaft 48 via the engine 14, on the other hand, the flywheel 51 and cooling fan 52 are rotated with the crankshaft 48.

Figure 3:
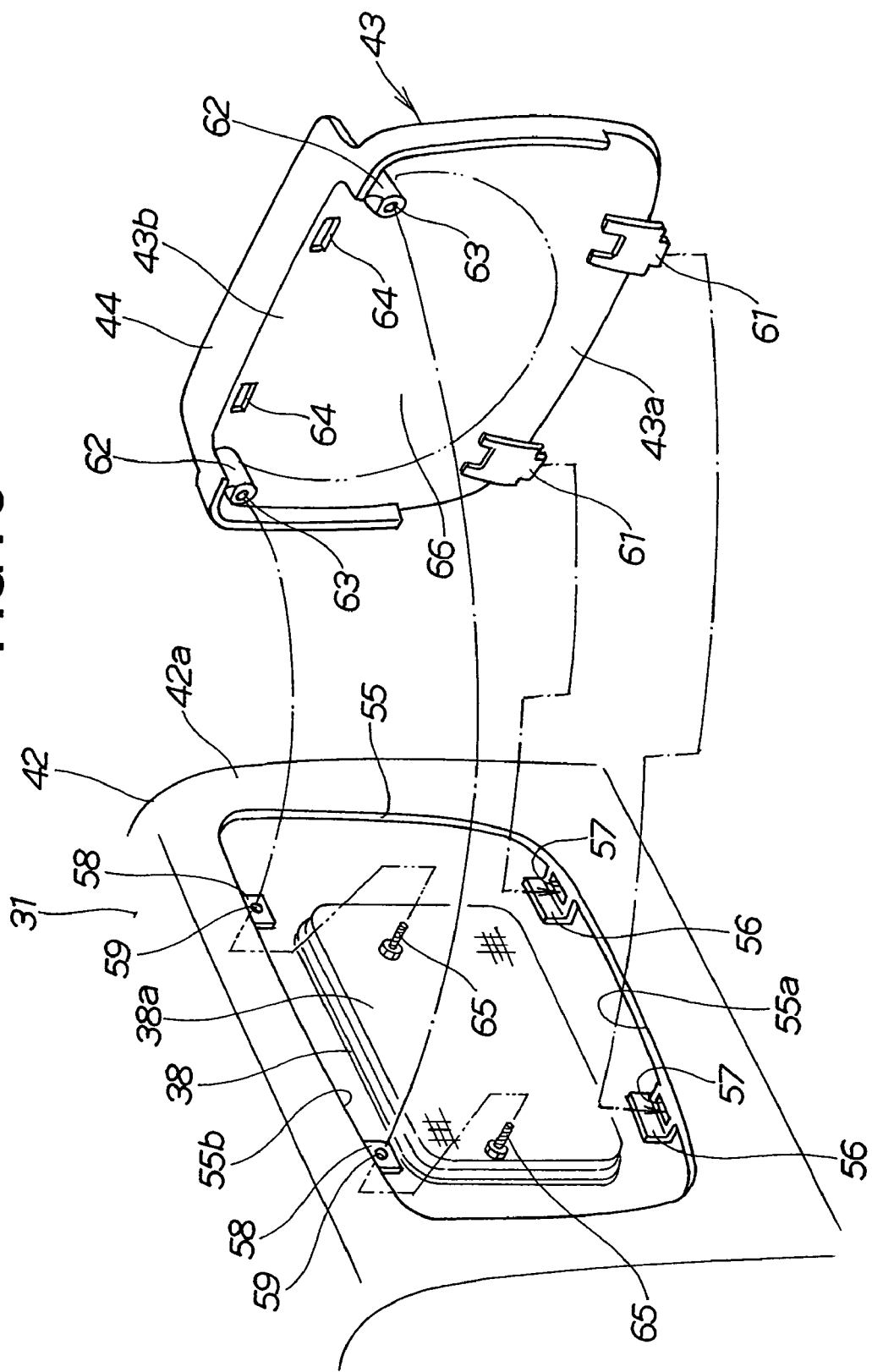
FIG. 3 is a perspective view showing an illumination section employed in the snow removing machine of the invention.

FIG. 3 is a perspective view of the illumination section 38 employed in the snow removing machine 10. The front sub-cover portion 42 of the upper cover section 31 has a substantially-rectangular front opening portion 55 formed in its front surface 42a in such a manner that the opening portion 55 lies right in front of a front surface 38a of the illumination section 38.

A pair of L-shaped supporting portions 56 are provided on a lower edge 55a of the opening portion 55, and each of the supporting portions 56 has an aperture 57 formed in its bottom base. A pair of downward projections 58 are provided on an upper edge 55b of the opening portion 55, and each of the projections 58 has an aperture 59.

The light transmitting section 43, which has a rectangular shape, is fitted in the opening portion 55 to allow passage of light projected from the illumination section 38. The light transmitting section 43 has a pair of engaging portions 61 projecting downward from its lower edge 43a, and a pair of bosses 62 formed on an upper edge region 43b and each having a threaded hole 63. A pair of rectangular through-holes 64 are formed at a predetermined interval in the upper edge region 43b between the bosses 62.

The eave portion 44 is formed integrally with and extends from the upper edge region 43b of the light transmitting section 43. Further, the eave portion 44 is located immediately above the through-holes 64, to thereby cover the through-holes 64 (see also FIG. 5).

The light transmitting section 43 is fitted in the opening portion 55 with the engaging portions 61 of the section 43 inserted in the corresponding apertures 57 of the L-shaped supporting pieces 56 and with the bosses 62 abutted against the projections 58. Bolt 65 is screwed, through a mounting hole 59 of each of the projections 58, into the threaded hole 63 of the corresponding boss 65 (see also FIG. 5). When the light transmitting section 43 is duly fitted in the opening portion 55 in this manner, a lens 66 of the section 43 is located right in front of the front surface 38a of the illumination section 38.

Figure 4:
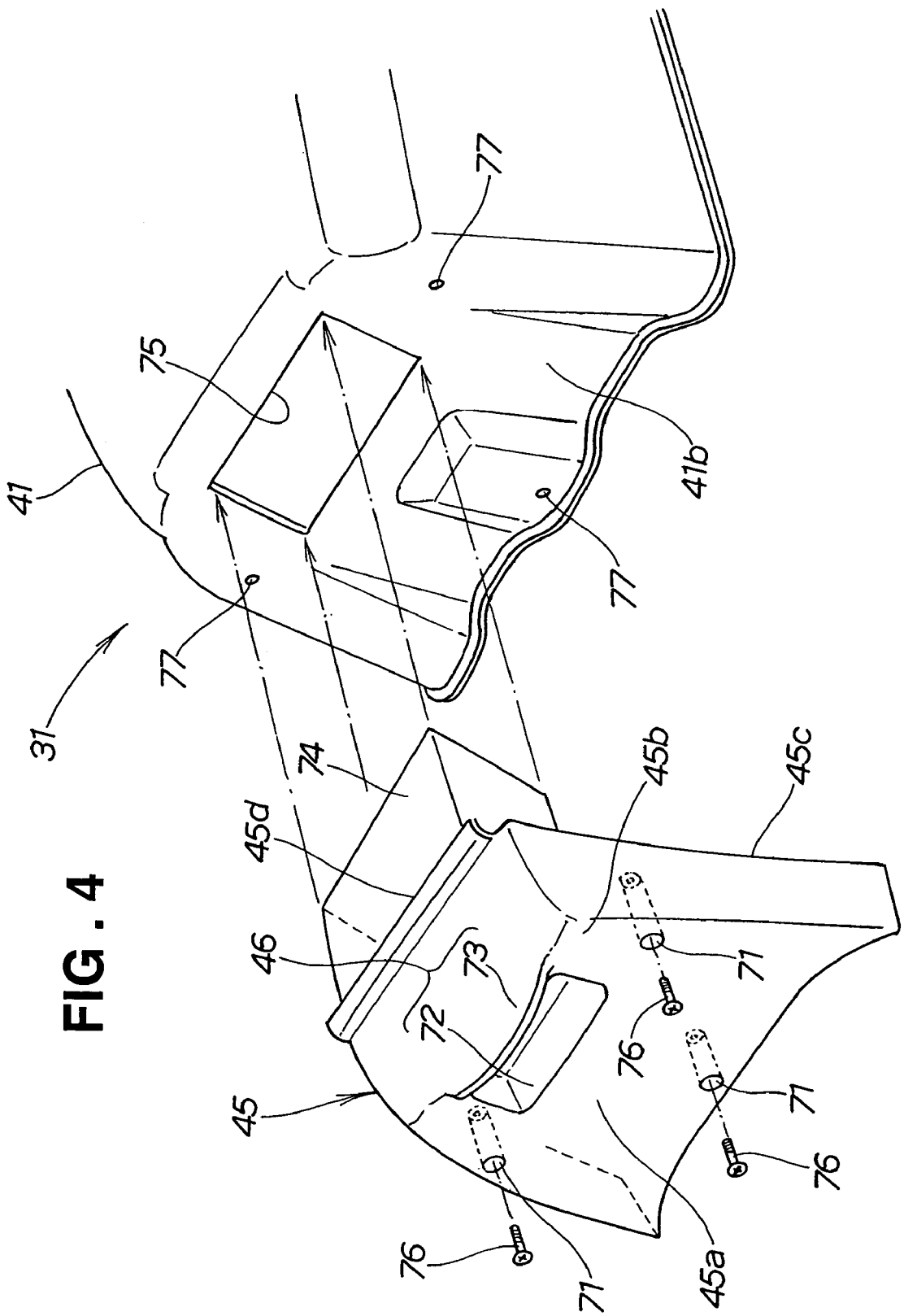
FIG. 4 is a perspective view showing a rear cover section of the snow removing machine of the invention.

FIG. 4 is a perspective view showing the rear cover section 45 of the snow removing machine. The rear cover section 45 has three screw holes 71 formed in the rear end portion 45a, and a rectangular recess portion 72 formed in an upper region 45b of the rear end portion 45a. The rear cover section 45 also has an overhang portion 73 projecting rearward from near an upper edge of the rectangular recess portion 72, and the recess portion 72 and overhang portion 73 together form the handle portion 46. The rear cover section 45 also has an insertion portion 74 projecting forward from near an upper edge 45d of its front portion 45c. The insertion portion 74 has a channel-like vertical sectional shape and inserted in an opening 75 of the upper cover body 41.

To attach the rear cover section 45 to the rear portion 41b of the upper cover body 41, the insertion portion 74 of the rear cover section 45 is fitted in the opening 75 of the upper cover body 41 (see also FIG. 6), and screws 76 are inserted through the screw holes 71 and screwed into corresponding screw holes 77 formed in the rear portion 41b of the upper cover body 41.

Figure 6:
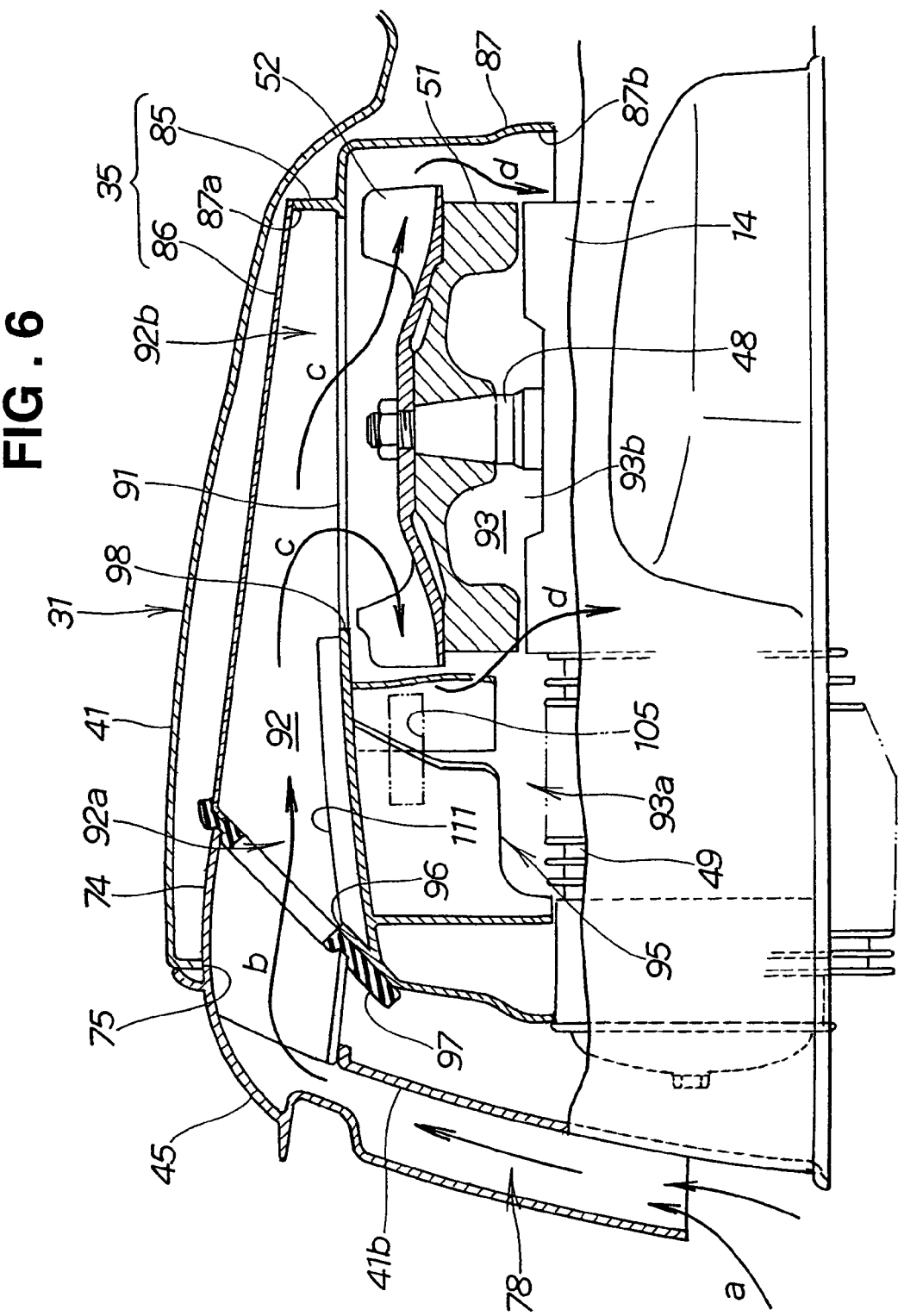
FIG. 6 is a sectional view showing an air duct employed in the snow removing machine of the invention.

The rear portion 41b of the upper cover body 41 and the rear cover section 45 attached thereto in the aforementioned manner together form an intake opening 78 for taking external air into the upper cover body 41 (upper cover section 31) (see also FIG. 6). The air taken in through the intake opening 78 is introduced into the upper cover body 41 to cool the engine 14, and a portion of the air is directed to an air cleaner 81 of FIG. 7.

Figure 5:
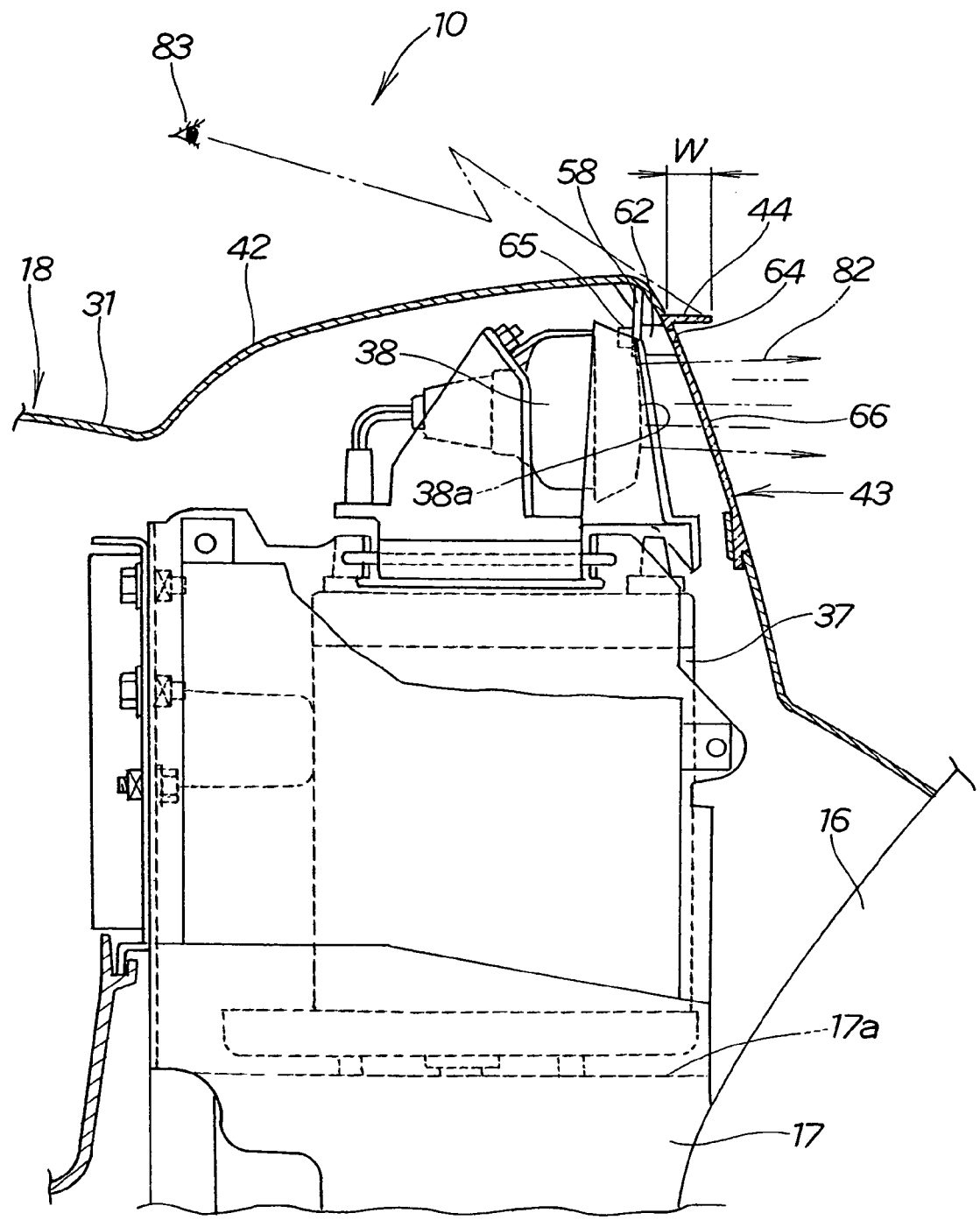
FIG. 5 is a sectional view showing important sections of the snow removing machine of the invention.

FIG. 5 is a sectional view showing important sections of the snow removing machine 10 of the present invention. As shown, the battery 37 is mounted on the upper portion 17a of the blower section 17, the illumination section 38 is provided over the battery 37, and the lens 66 of the light transmitting section 43 is positioned right in front of the front surface 38a of the illumination section 38. Light 82 projected from the front surface 38a of the illumination section 38 passes through the lens 66 of the light transmitting section 43 to illuminate an area in front of the snow removing machine 10.

The eave portion 44 for the light transmitting section 43 extend forward up to a position where the human operator can look at the eave portion 44 with his or her eyes 83 when operating the machine 10 at a predetermined position, i.e. when walking behind the control panel 23 while holding the grips 24 and 25 of the left and right operating handles 21 and 22 (see FIG. 1). The eave portion 44 has a dimension (width) W in the rear-to-front direction of the snow removing machine 10. Further, the eave portion 44 is located immediately above the through-holes 64 (see also FIG. 3) to cover the through-holes 64 in order to prevent rain water from entering the through-holes 64.

As seen clearly in FIG. 2, the engine 14 (see FIG. 2), battery 37 and illumination section 38 are covered collectively with the upper cover section 31 of the cover member 18, and thus some arrangements are required to let out generated heat from the engine 14 and illumination section 38. This is why the through-holes 64 are formed below the eave portion 44. Gas (e.g., hydrogen) generated from the battery 37 is also allowed to escape through the through-holes 64.

Namely, in the snow removing machine 10 of the present invention, the illumination section 38 is disposed forwardly of the engine 14, the engine 14 and illumination section 38 are collectively covered with the same or common upper cover section 31 (cover member 18), and the upper cover section 31 includes the light transmitting section 43 for passing the light projected from the illumination section 38. The upper cover section 31 covering the illumination section 38 can reliably protect the illumination section 38 from wind and rain. Further, because the illumination section 38 is covered with the same upper cover section 31 as the engine 14, there is no need to provide a separate cover for the illumination section 38, which therefore can avoid an increase in the number of the components of the snow removing machine 10.

FIG. 6 is a sectional view showing the air duct 35 employed in the snow removing machine 10. The engine 14 is provided on the transmission case 11 (FIG. 2) with the crankshaft 48 oriented in the vertical direction, and the air duct 35 is provided above the engine 14 so as to cover the cooling fan 52.

Figure 8:
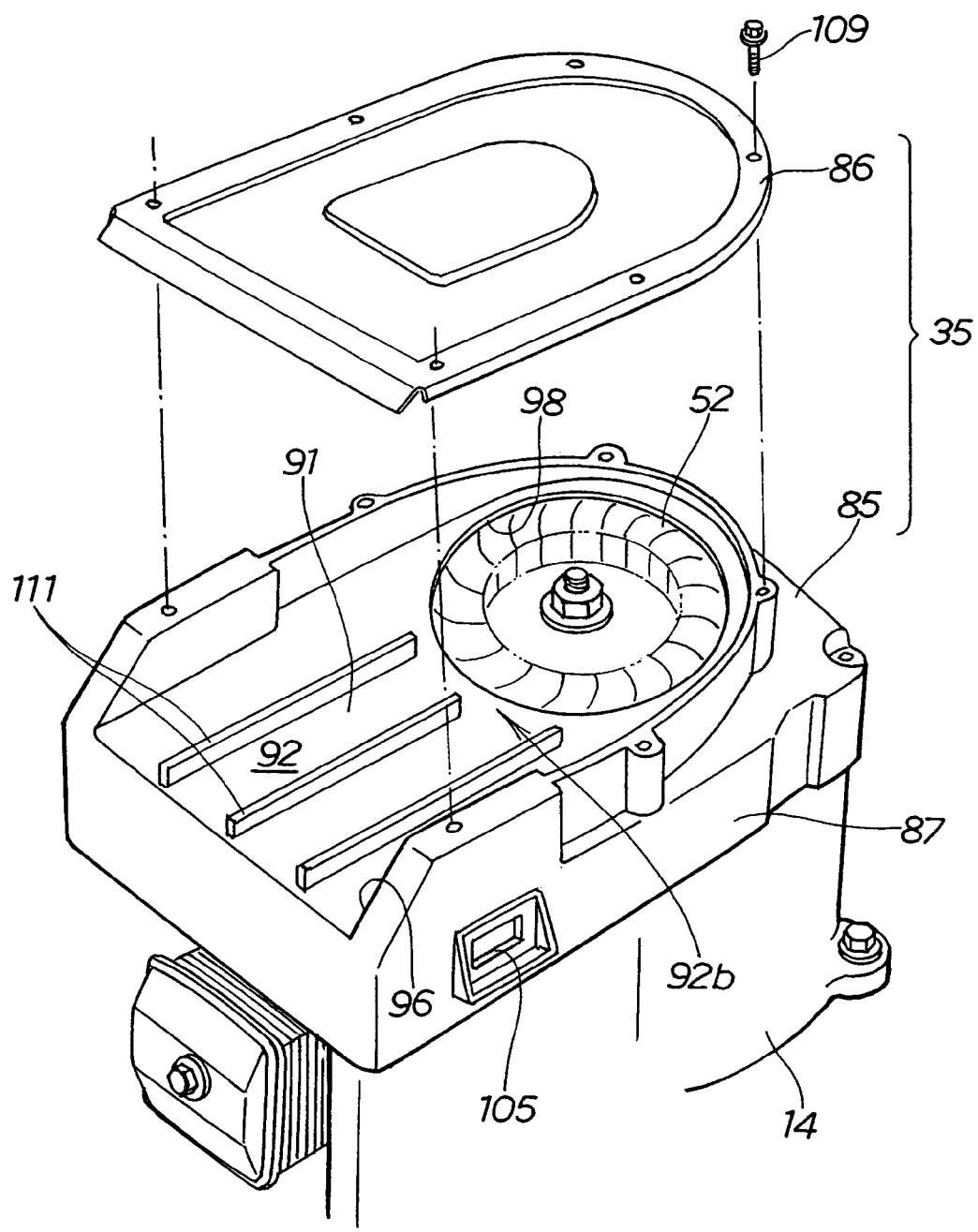
FIG. 8 is an exploded perspective view of the air duct.

The air duct 35, which is in the shape of a generally rectangular box, includes a duct body 87 and a top plate 86 secured to the top of the duct body 85, as also seen from FIG. 8. The duct body 85 has a generally rectangular peripheral wall 87 (see also FIG. 8) having an upward opening 87a closed with the top plate 86 and a downward o illumination section 38pening 87b through which the cooling fan 52 is introduced and accommodated in the air duct 35. Intermediate partition wall 91 is formed substantially horizontally between the upward and downward openings 87a and 87b. First air intake passage 92 is defined between the partition wall 91 and the top plate 86, and a second air intake passage 93 is defined by a space formed under the partition wall 91.

Further, the air duct 35 has a maze portion 95 formed in a rear (downstream) region 93a of the second air intake passage 93, and the cooling fan 52 and flywheel 51 are accommodated in a front (upstream) region 93b of the second air intake passage 93. Rear (upstream) region 92a of the first air intake passage 92 has an opening portion 96 in which a seal member 97 is fixedly mounted, and the partition wall 91 has a communication aperture 98 formed in its front region facing the cooling fan 52. The first and second air intake passages 92 and 93 communicate with each other via the communication aperture 98.

With the upper cover section 31 covering the air duct 35, the insertion portion 74 of the rear cover section 45 abuts at its distal end against the seal member 97 of the air duct 35. Thus, the intake opening 78 defined by the rear portion 41b of the upper cover body 41 and rear cover section 45 communicates with the first air intake passage 92 via the insertion portion 74.

Rotating the cooling fan 52 can cause external air to be taken in through the intake opening 78 as indicated by arrow "a", and the thus taken-in air is directed through the insertion portion 74 and opening portion 96 into the first air intake passage 92 as indicated by arrow "b". The air is then directed from the first air intake passage 92, via the communication aperture 98, into the second air intake passage 93 as indicated by arrow "c".

A portion of the air directed into the second air intake passage 93 is then directed through the maze portion 95 to the air cleaner 81 (see FIG. 7), and the remaining air is directed downward, as indicated by arrow "d", to cool the engine 14. The air thus directed to the air cleaner 81 is supplied to the engine 14 via a carburetor 101 (FIG. 7).

Namely, in the snow removing machine 10 of the present invention, external air is introduced by means of the cooling fan 52 mounted at the upper end of the crankshaft 48 of the engine 14, and a portion of the introduced air is supplied via the air cleaner 81 (FIG. 7) to the engine 14 while the remaining air cools the engine 14. Thus, desired snow removing work can be done via the engine 14 appropriately functioning as a drive source. Further, the engine 14 and air cleaner 81 are covered with the upper cover section 31 (cover member 18), the first air intake passage 92 extends from the intake opening 78, formed in the upper cover section 31, to the cooling fan 52 while the second air intake passage 93 extends from the cooling fan 52 to the air cleaner 81, and the second air intake passage 93 has the maze portion 95 capable of limiting passage of snow powder and other foreign substances.

Figure 7:
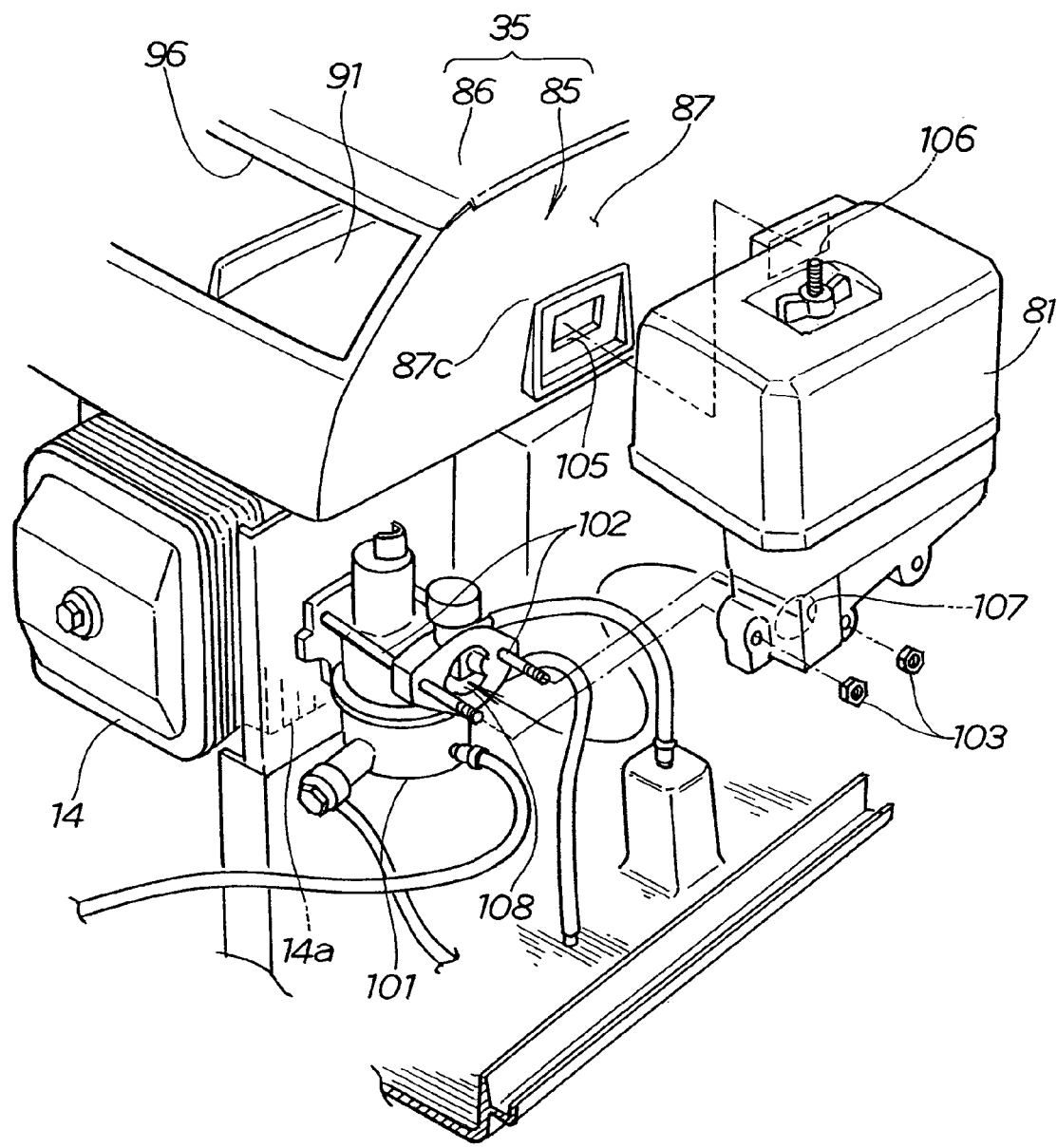
FIG. 7 is an exploded perspective view illustrating relationship between the air duct and air cleaner employed in the snow removing machine of the invention.

FIG. 7 is an exploded perspective view illustrating relationship between the air duct 35 and air cleaner 81 in the snow removing machine 10. The carburetor 101 is secured to a right rear portion 14a of the engine 14 and the air cleaner 81 is secured to the carburetor 101, by means of bolts 102 and nuts 103. The thus-secured air cleaner 81 abuts against a right rear portion 87c of the peripheral wall 87 of the air duct 35, and an air supply opening 105 (see also FIG. 6) of the second air intake passage 93 communicates with an air supply hole 106 of the air cleaner 81. With the supply opening 105 of the second air intake passage 93 communicating with the air supply hole 106, air introduced via the air supply hole 106 to the air cleaner 81 is passed through a filter (not shown) in the cleaner 81, and then the air is directed via an air supply opening 107 of the cleaner 81 to an air inlet 108 of the carburetor 101.

FIG. 8 is an exploded perspective view of the air duct 35 in the snow removing machine 10 of the present invention. In the air duct 35, the top plate 86 is secured, via bolts 109, to the top edge of the duct body 88 having a shape of a generally rectangular box. The peripheral wall 87 is formed into a generally rectangular shape, and the cooling fan 52 faces the communication aperture 98 formed in the partition wall 91. The first air intake passage 92 is defined by the peripheral wall 87, partition wall 91 and top plate 86 secured to the top edge of the peripheral wall 87, and the cooling fan 52 is positioned in a downstream region 92b of the first air intake passage 92. The partition wall 91 has a plurality of guide portions (guide ridges in the illustrated example) 111 formed on its upper surface for smoothing air flows.

Figure 9:
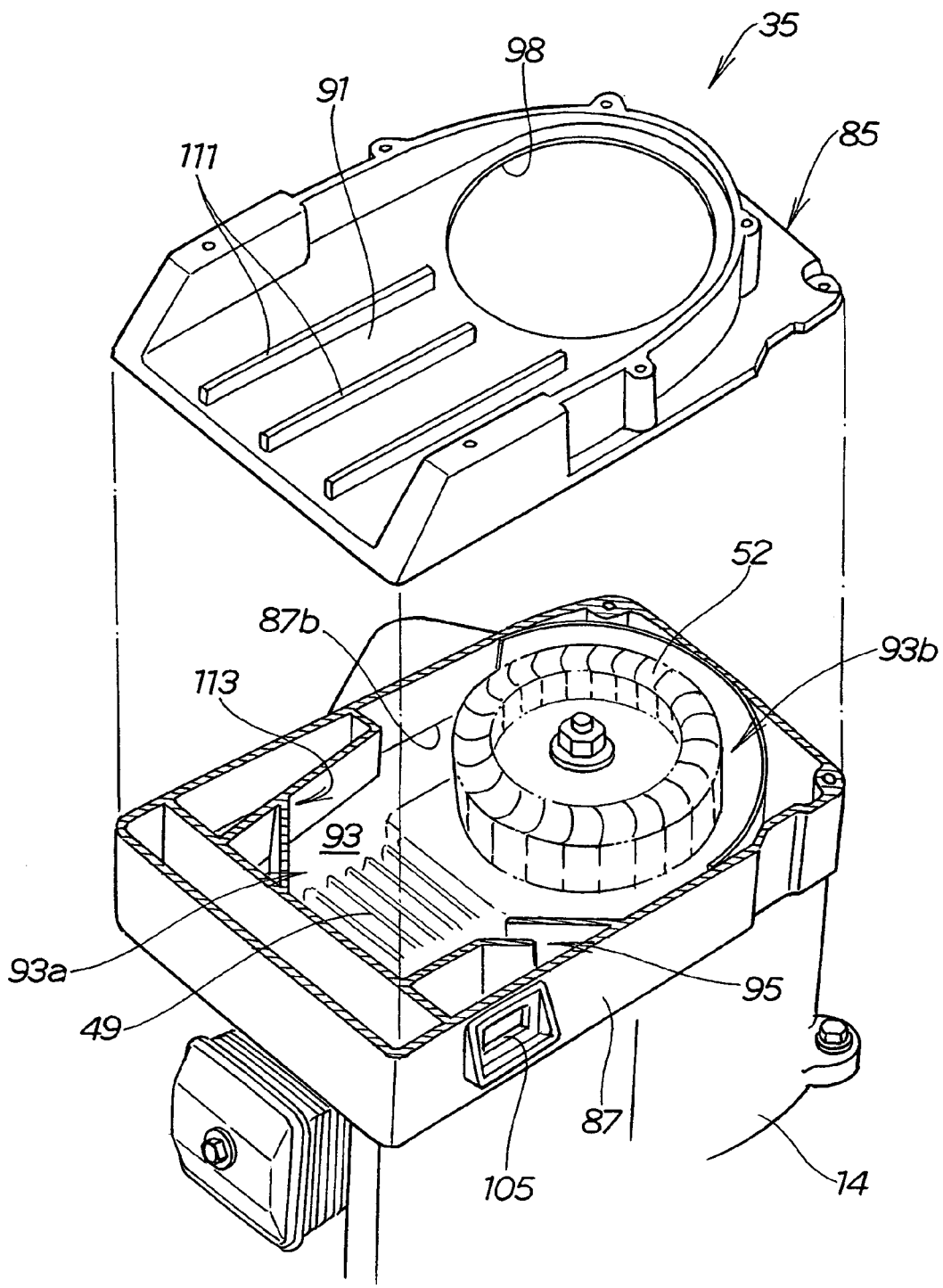
FIG. 9 is a perspective view showing the air duct in the snow removing machine with an upper section of the air duct taken away.

FIG. 9 is a perspective view showing the air duct 35 in the snow removing machine 10 with an upper section of the duct 35 taken away. With the air duct 35 disposed on the engine 14, the cooling fan 52 is accommodated in the front (upstream) region 93b of the second air intake passage 93, and the downward opening 87b defined by the peripheral wall 87 of the air duct 35 is closed with an upper portion of the engine 14. In this way, the second air intake passage 93 is defined by the peripheral wall 87, partition wall 91 and upper portion of the engine 14 beneath the first air intake passage 92.

The second air intake passage 93 has a guide section 113 formed on an upper surface of its downstream region 93a, and the maze portion 95 is formed to communicate with the air supply opening 105 in the second air intake passage 93. The guide section 113 functions to appropriately guide air (cooling air) supplied via the cooling fan 52 to the maze portion 95. The maze portion 95 functions to remove snow powder and other foreign substances from the air having been delivered thereto via the guide section 113. The maze portion 95 and guide section 113 have their respective upper end edges formed integrally with the underside of the partition wall 91.

Figure 10:
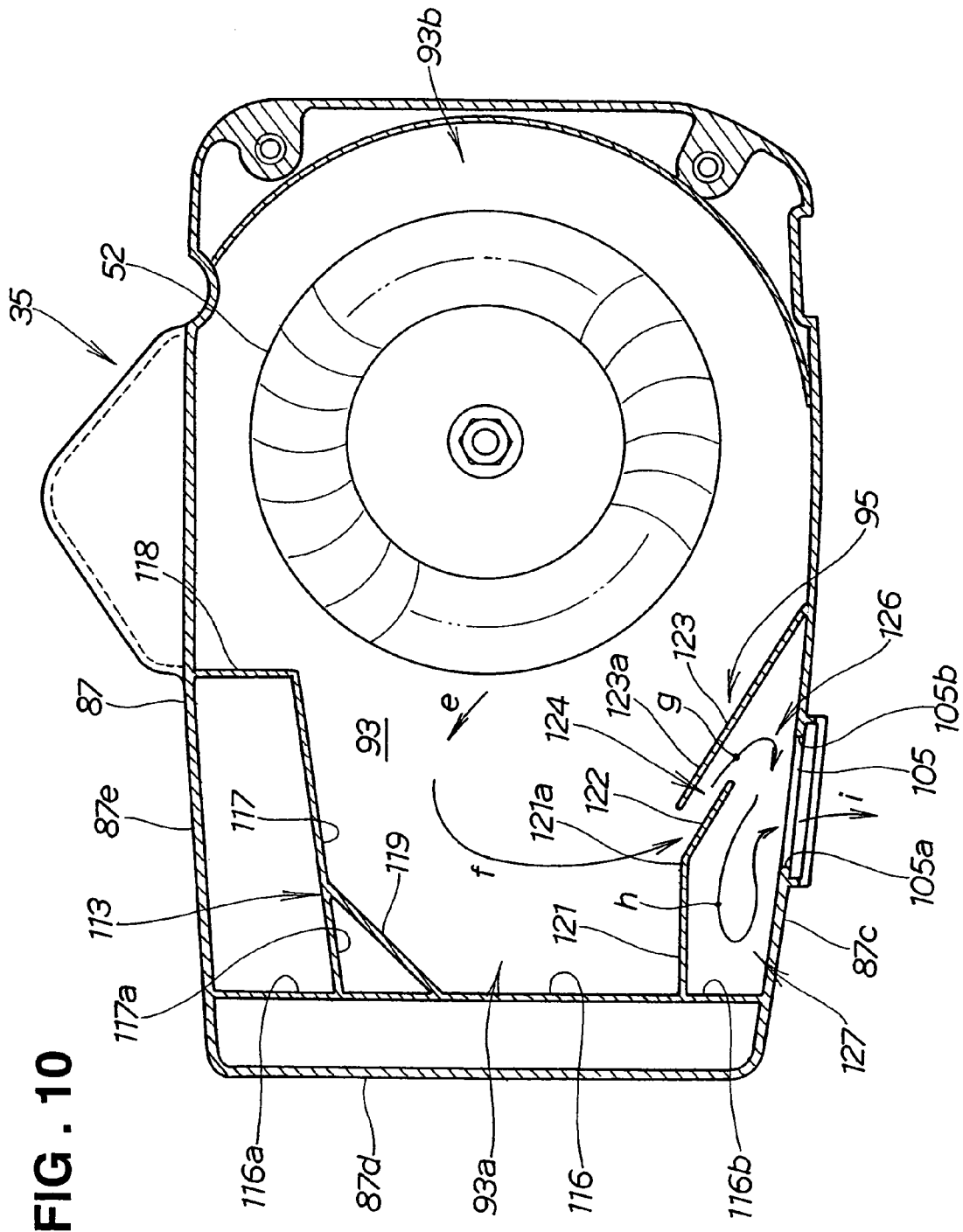
FIG. 10 is a sectional view showing the air duct employed in the snow removing machine.

FIG. 10 is a sectional view showing the air duct 35 employed in the snow removing machine 10. The guide section 113 of the second air intake passage 93 includes a rear guide portion 116 spaced in parallel to and a predetermined distance from a rear end 87d of the peripheral wall 87, and a left guide portion 117 extending upstream from a left end portion 116a of the rear guide portion 116 substantially parallel to a left rear portion 87e of the peripheral wall 87. Upstream end portion 118 of the left guide portion 117 is bent outward and abuts against the left rear portion 87e. The guide section 113 also includes a slanted guide portion 119 extending obliquely from a downstream end portion 117a of the left guide portion 117 toward the rear guide portion 116.

The maze portion 95 is defined by the rear guide portion 116 and right rear portion 87c. The maze portion 95 includes a first shield plate 121 positioned adjacent to the air supply hole 106 of the air cleaner 81, more specifically the air supply opening 105 in the second air intake passage 93. End portion of the first shield plate 121 adjacent to the cooling fan 52 is bent obliquely toward the air supply opening 105 to thereby provide a bent portion 122. The maze portion 95 also includes a second shield plate 123 positioned a predetermined distance from the bent portion 122. The second shield plate 123 and bent portion 122 together define a guide passage 124 that extends in a direction different from a travel direction of the cooling air and communicates with the air supply opening 105.

With the guide section 113 provided near the maze portion 95, the cooling air can be appropriately directed toward the maze portion 95.

The first shield plate 121 of the maze portion 95 has a portion that extends from a right end portion 116b of the rear guide portion 116 to a position corresponding to a rear edge 105a of the air supply opening 105 in substantially parallel relation to and at a predetermined distance from the right rear portion 87c. The bend portion 122 of the first shield plate 121 extends obliquely from a point 121a outward toward a front edge 105b of the air supply opening 105. Air passage 126 is defined by the bend portion 122, air supply opening 105 and front edge 105b.

The second shield plate 123, which extends from the right rear portion 87c, has a distal end portion 123a extending parallel to and spaced a predetermined distance from the bend portion 122. The distal end portion 123a of the second shield plate 123 and the bend portion 122 of the first shield plate 121 together define a guide passage 124, and the first and second shield plates 121 and 123 and the right rear portion 87c together define a preliminary chamber 127.

Namely, in the air duct 35 thus constructed, air is led to the second air intake passage 93 via the cooling fan 52 as depicted by arrow "e" and then directed along the guide section 113, as depicted by arrow "f", to impinge on the bend portion 122, after which the air is guided through the guide passage 124 into the preliminary chamber 127 as indicated by arrow "g". The air thus introduced into the preliminary chamber 127 is then directed to the air supply opening 105 as depicted by arrow "h", via which the air is supplied to the air cleaner 81 as depicted by arrow "i" (see FIG. 7).

Namely, the provision of the guide section 113 near the maze portion 95 allows the air to impinge on the bent portion 122 of the maze portion 95, where snow powder and other foreign substances can be appropriately removed from the air. Also, the air is introduced into the preliminary chamber 127, where a flow speed of the introduced air or wind speed is adjusted properly and the air is heated appropriately using heat of the engine 14 (see FIG. 9). In this way, suitable air can be supplied to the air cleaner 81. Further, the provision of the maze portion 95 in the second air intake passage 93 can prevent excessive air from being supplied to the air cleaner 81 when the engine 14 is operating at high speed.

Figure 11A:
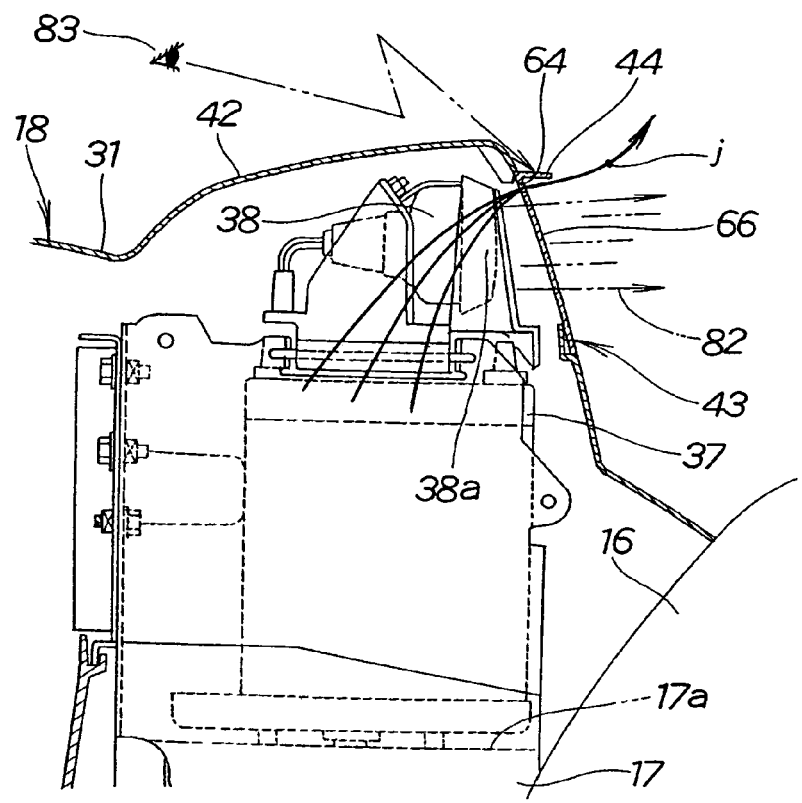
FIG. 11A is a view explanatory of behavior of a light transmitting section and eave portion in the snow removing machine of the invention.
Figure 11B:
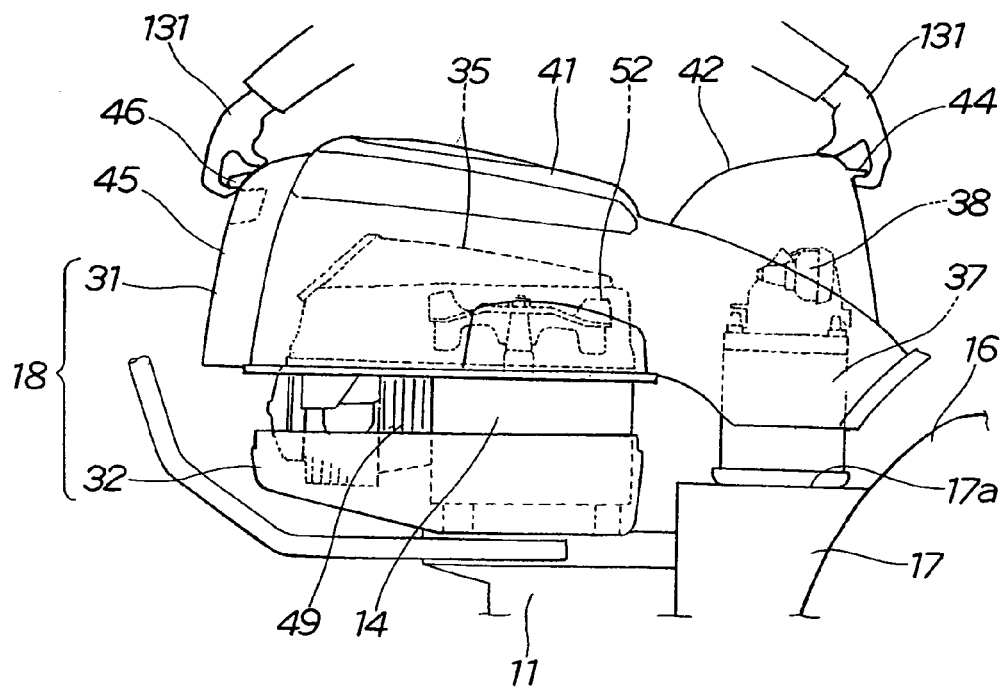
FIG. 11B is a view explanatory of how an upper cover section is attached and detached.

FIG. 11A is a view explanatory of behavior of the light transmitting section 43 and eave portion 44 in the snow removing machine 10, and FIG. 11B is a view explanatory of how the upper cover section 31 is attached and detached. In FIG. 11A, light 82 is projected from the front surface 38a of the illumination section 38, and the projected light 82 passes through the lens 66 of the light transmitting section 43 and illuminates an area in front of the machine 10. The eave portion 44 is formed integrally with and extends from the light transmitting section 43, and thus a portion of the light projected from the illumination section 38 reaches the eave portion 44 as it passes through the transmitting section 43, from which the portion of the light scatters. The light scattering from the eave portion 44 lights up the eave portion 44, which makes it easier for the human operator to look at the eave portion 44 with his or her eyes 83.

Further, because the eave portion 44 for the light transmitting section 43 extends forward up to the position where the human operator can view the eave portion 44, the human operator can readily visually ascertain an ON/OFF state of the illumination section 38 by just looking at the eave portion 44 from an ordinary operating position behind the control panel.

In the case where the engine 14 and illumination section 38 are covered with the same upper cover section 31, heat (hot air) produced from the illumination section 38 might undesirably pile up within the upper cover section 31. Thus, there is a possibility of the heat adversely influencing the engine 14 and evaporating moisture within the upper cover section 31 so that the light transmitting section 43 may get cloudy.

To avoid the inconvenience, the pair of through-holes 64 are formed beneath the eave portion 44 (see also FIG. 3) so that heat produced from the engine 14 and illumination section 38 can escape via the through-holes 64. In addition, the pair of through-holes 64 formed beneath the eave portion 44 can also let out gas (e.g., hydrogen) generated from the battery 37. Further, the eave portion 44 can prevent rain water from entering the through-holes 64, so that electric equipment, such as the illumination section 38 and battery 37, can be protected from rain water.

As illustrated in FIG. 11B, the eave portion 44 extends forward from the light transmitting section 43, and the handle portion 46 is provided on the rear end portion 45a of the rear cover section 45. Thus, the human operator can readily attach and detach the upper cover section 31 by just holding the eave portion 44 and handle portion 46 with both hands 131. In addition, because the eave portion 44 can be used as a handle in attaching/detaching the upper cover section 31, there is no need to provide a separate handle for the purpose of attaching/detaching the upper cover section 31.

Figure 12A:
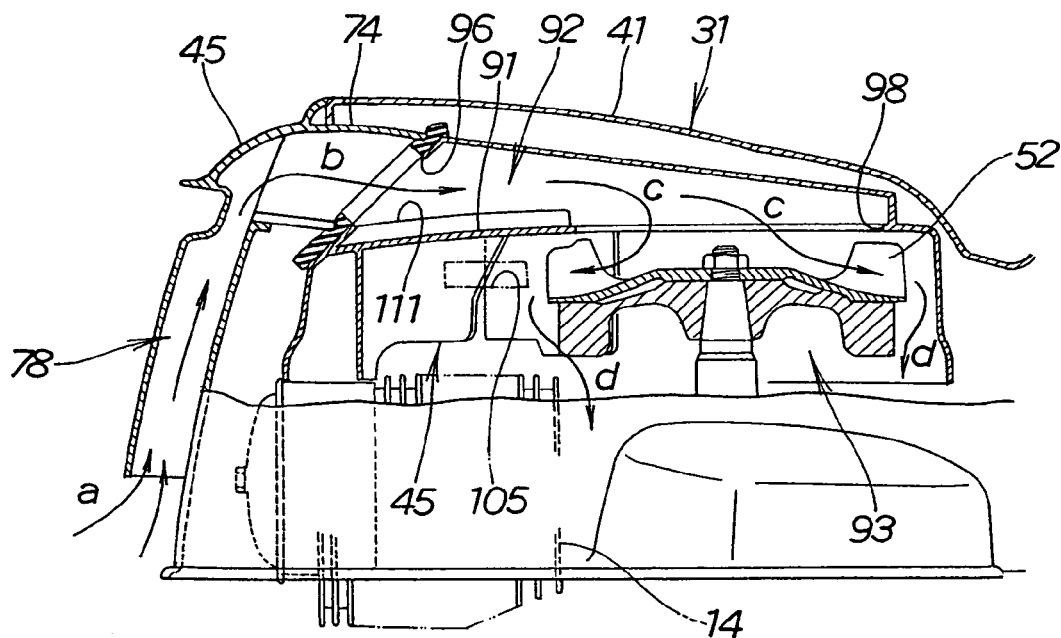
FIGS. 12A and 12B are views explanatory of air flows within a first air intake passage in the air duct of the snow removing machine of the invention.
Figure 12B:
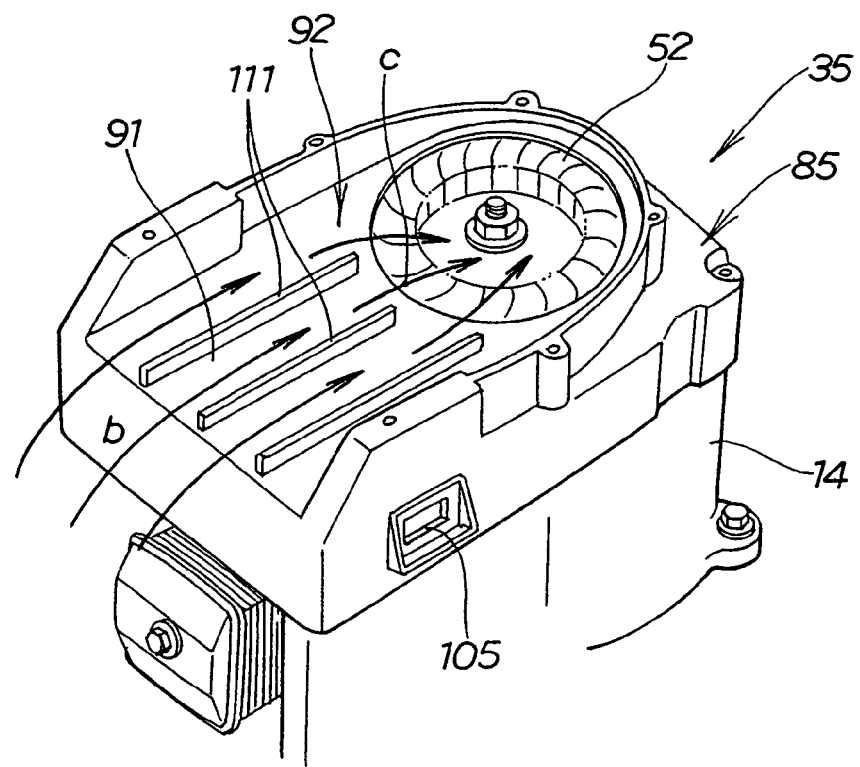

FIGS. 12A and 12B are views explanatory of air flows within the first air intake passage 92 employed in the air duct 35 of the snow removing machine 10 of the present invention. As shown in FIG. 12A, rotating the cooling fan 52 can cause external air to be taken in through the intake opening 78 as indicated by arrow "a", and the thus taken-in air is directed through the insertion portion 74 and opening portion 96 into the first air intake passage 92 as indicated by arrow "b". The air is then directed from the first air intake passage 92, via the communication aperture 98, into the second air intake passage 93 as indicated by arrow "c".

A portion of the air directed into the second air intake passage 93 is then directed through the maze portion 95 to the air cleaner 81, and the remaining air is directed downward, as indicated by arrow "d", to cool the engine 14.

As seen in FIG. 12B, the plurality of guide portions 111 formed on the partition wall 91 function to smoothly direct the air to the first air intake passage 92 as depicted by arrow "b" and smoothly direct the air from the passage 92 toward the cooling fan 52 as depicted by arrow "c".

Figure 13A:
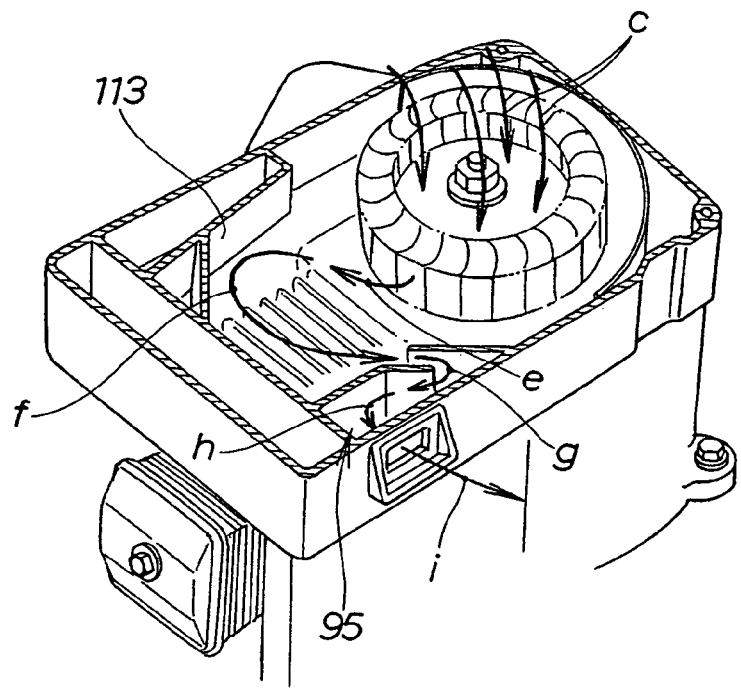
FIGS. 13A and 13B are views explanatory of air flows within a second air intake passage in the air duct of the snow removing machine of the invention.
Figure 13B:
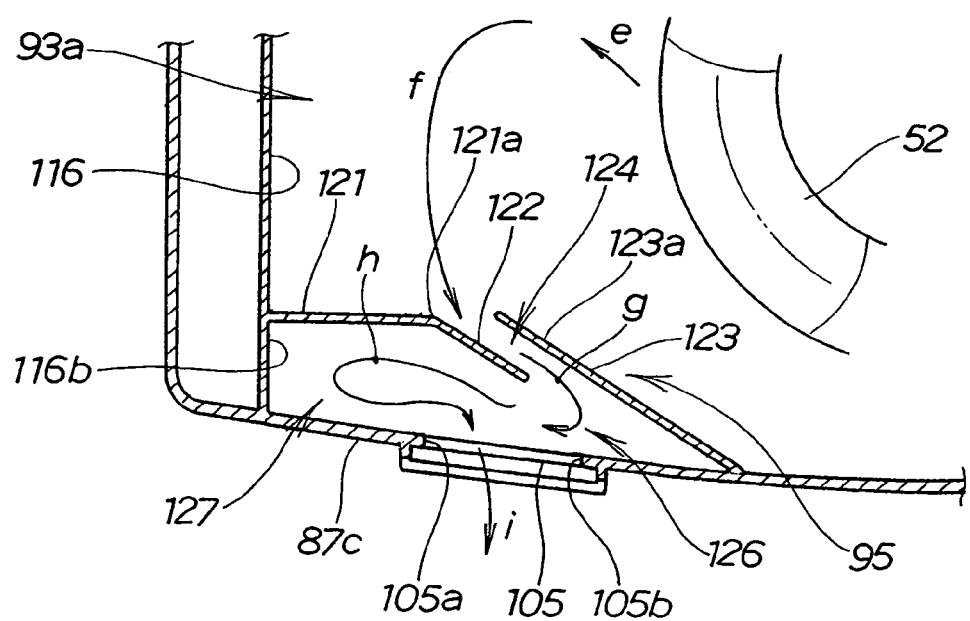

FIGS. 13A and 13B are views explanatory of air flows within the second air intake passage 93 in the air duct 35 of the snow removing machine 10 of the present invention. As shown in FIG. 13A, the portion of the air led to the second air intake passage 93 as indicated by arrow "c" is directed to a downstream region of the second air intake passage 93 as depicted by arrow "e" and then directed along the guide section 113, as depicted by arrow "f", to the maze portion 95.

Then, as seen in FIG. 13B, the air directed along the guide section 113 as depicted by arrow "f" is caused to impinge on the bend portion 122, after which the air is guided through the guide passage 124 into the preliminary chamber 127 as depicted by arrow "g". The air thus introduced into the preliminary chamber 127 is then directed to the air supply opening 105 as depicted by arrow "h", via which the air is supplied to the air cleaner 81 as depicted by arrow "i" (see FIG. 7).

Namely, the provision of the guide section 113 near the maze portion 95 allows the air to impinge on the bent portion 122 of the maze portion 95, where snow powder and other foreign substances can be appropriately removed from the air.

The bent portion 122 of the first air intake passage 121 and the second shield plate 123 together define the guide passage 124 that extends in a direction different from the traveling direction of the cooling air and communicates with the air supply opening 105 of the air cleaner 81. With the air caused to impinge on the bent portion 122 of the first air intake passage 121 as set forth above, snow powder in the air can be efficiently attached to the bent portion 122 and thereby appropriately removed from the air, so that only clean air can be introduced into the air cleaner 81.

Further, the provision of the maze portion 95 in the second air intake passage 93 can prevent excessive air from being supplied to the air cleaner 81 when the engine 14 is operating at high speed.

Furthermore, the air is led to the preliminary chamber 127 provided in a downstream region of the maze portion 95, which appropriately adjusts the flow speed of the air or wind speed and properly heats the air using heat of the engine 14 (see FIG. 9). In this way, suitable air can be supplied to the air cleaner 81.

Whereas the preferred embodiment has been described above in relation to the case where the pair of through-holes 64 are formed in the light transmitting section 43, the present invention is not so limited. For example, the pair of through-holes 64 may be formed in a component located near the light transmitting section 43. Furthermore, the number of through-holes 64 may be other than just two, such as one or more than two.

Moreover, although the preferred embodiment has been described above in relation to the case where the eave portion 44 extends forward from the light transmitting section 43, the present invention is not so limited. For example, the eave portion 44 may extend forward from the sub-cover portion 42 of the upper cover section 31.

Figure 14:
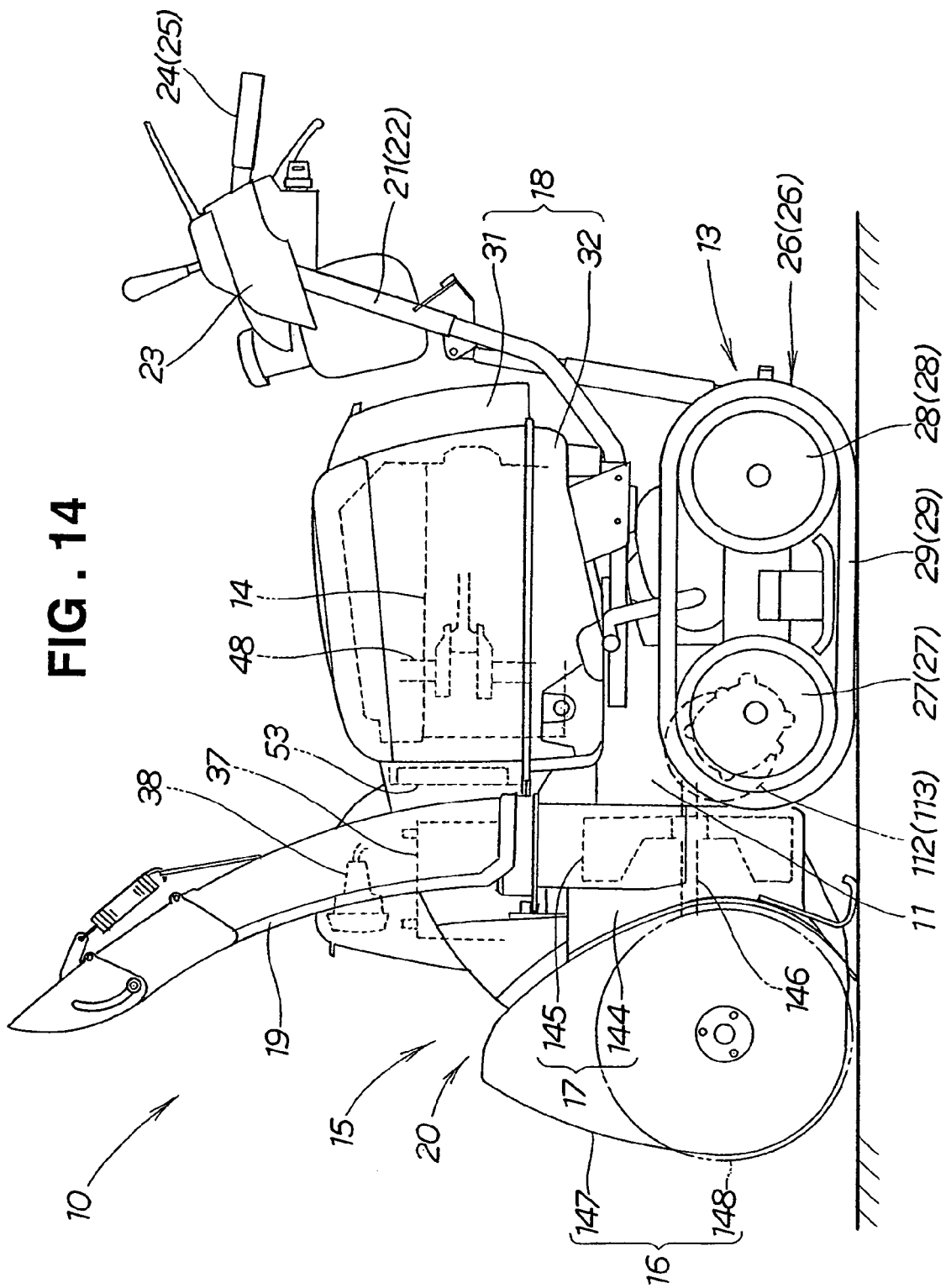
FIG. 14 is a side view showing the snow removing machine in accordance with another aspect of the present invention, which particularly shows a battery support structure employed in the snow removing machine.

FIGS. 14 to 26 show the snow removing machine 10 in accordance with another aspect of the present invention, where the same reference numerals as in FIGS. 1–13 represent the same elements. FIG. 14 is a side view of the snow removing machine 10. The left and right electric motors 112 and 113 are mounted to lower portions of the left and right sides of the transmission case 11, and the traveling unit 13 is operatively connected to the left and right electric motors 112 and 113. The engine 14 and the traveling unit 13 (left and right traveling sections 26) are positioned in a substantial lengthwise middle portion of the transmission case 11 as viewed sideways. The traveling unit 13 includes the left and right traveling sections 26 located outwardly the respective left and right motors 112 and 113. The transmission case 11 and snow removing unit 15 together constitute a machine body 20.

In this snow removing machine 10, the left and right drive wheels 27 are driven by the left and right motors 112 and 113 to thereby drive left and right crawler belts 29 so that the machine 10 can be caused to travel. Under this condition, the snow removing unit 15, i.e. the auger section 16 and blower section 17, are driven by the engine 14 to perform desired snow removing work.

Figure 15:
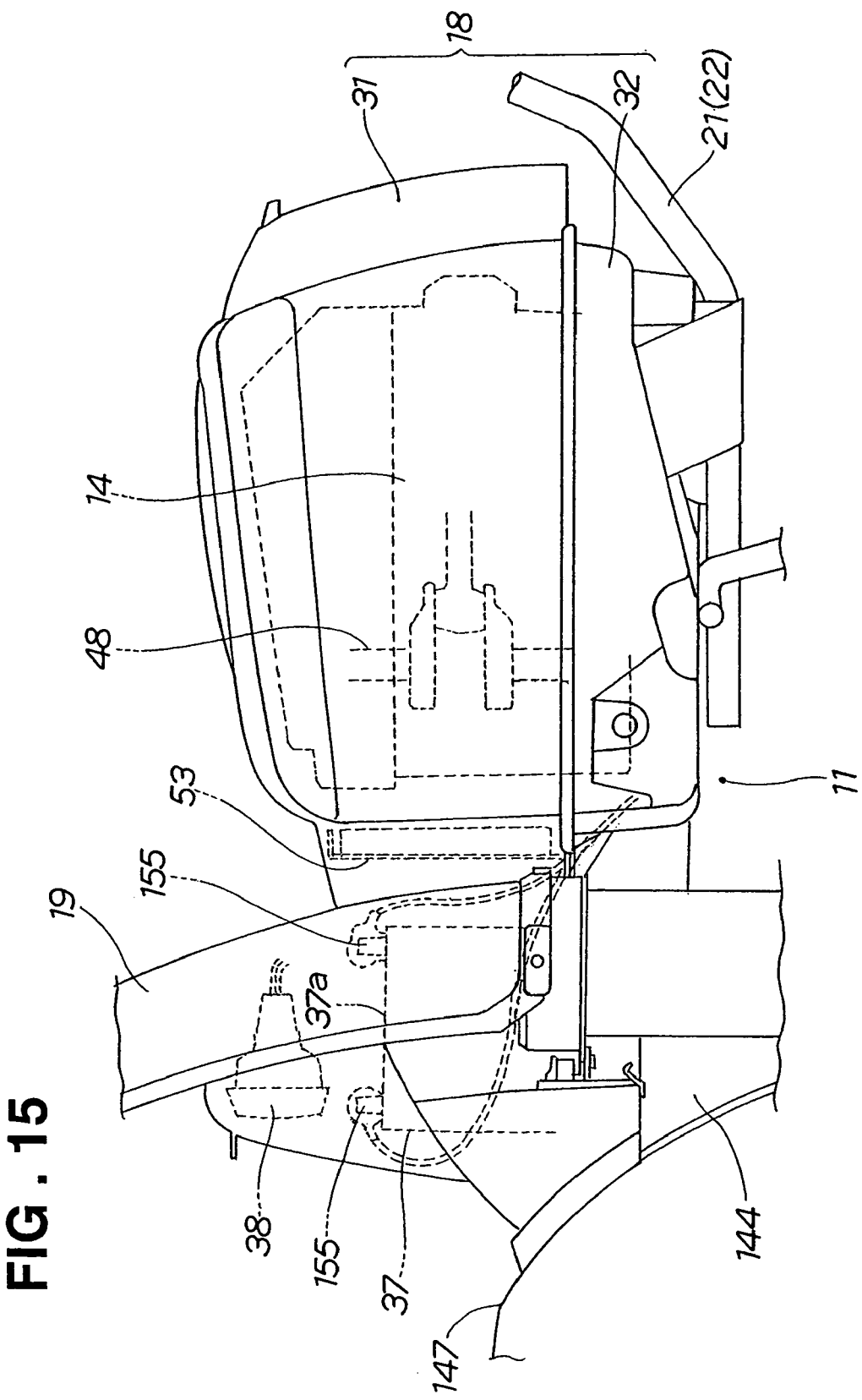
FIG. 15 is a fragmentary expanded view of the snow removing machine of FIG. 14.
Figure 16:
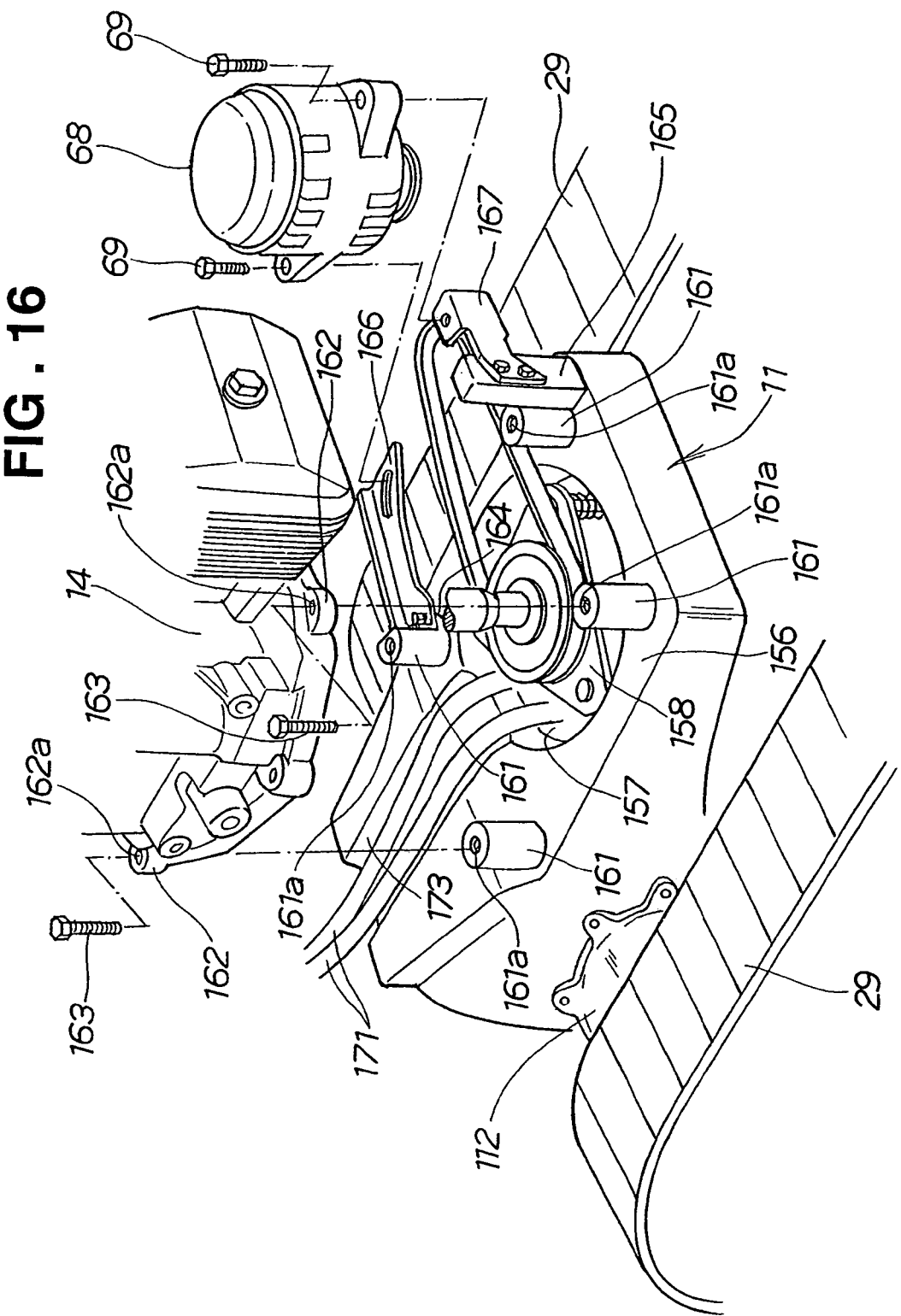
FIG. 16 is a perspective view illustrating mounting relationship between a transmission case and an engine in the snow removing machine of FIG. 14.

The transmission case 11, which is located substantially centrally of the snow removing machine 10, has a rectangular shape as viewed in top plan (see FIG. 16). The left and right traveling sections 26 are disposed adjacent to lower portions of the left and right sides, respectively, of the transmission case 11, and the snow removing unit 15 is secured to the front of the transmission case 11. The left and right operating handles 21 and 22 extend rearwardly and upwardly the left and right sides of the transmission case 11 (see also FIGS. 15 and 16).

The blower section 17 includes a blower housing 144 secured to the front of the transmission case 11, and a blower 145 positioned within the blower housing 144 and connected to a drive shaft 146.

The auger section 16 includes an auger housing 147 secured to the front of the blower housing 144, and an auger 148 rotatably mounted in the auger housing 147.

FIG. 15 is a fragmentary expanded view of the snow removing machine of FIG. 14. As shown, the vertical engine 14 is mounted on an upper portion of the transmission case 11, the battery 37 is disposed in front of the engine 14 and on the blower housing 144, and the illumination section 38 is disposed over the battery 37.

The battery 37 is a box-shaped battery having terminals 155 on its upper surface 37a. Partition wall 53 is disposed between the engine 14 and the battery 37 for blocking heat transferred from the engine 14 toward the battery 37.

The lower cover section 32 of the cover member 18 is secured to an upper portion of the transmission case 11, and the upper cover section 31 is attached to the lower cover section 32 to thereby collectively cover the battery 37, illumination section 38, engine 14 and partition wall 53.

FIG. 16 is a perspective view illustrating mounting relationship between the transmission case 11 and the engine 14 in the snow removing machine 10 of FIG. 14. The transmission case 11 has a recess 157 formed in its upper surface 156 for accommodating therein an electromagnetic clutch 158. Four mounting bosses 161 projecting upward are formed on the upper surface 156 around the recess 157 so as to surround the electromagnetic clutch 158.

The engine 14 has four overhang portions 162 (only two of which are shown in the figure) at positions corresponding to the four mounting bosses 161. Each of the overhang portions 162 has a mounting hole 162a corresponding to a screw hole 161a of one of the bosses 161. Bolt 163 is inserted through each of the mounting hole 162a and screwed into the screw hole 161a of the corresponding boss 161, so that the engine 14 is secured to the four bosses 161 of the transmission case 11.

Front mounting portion 164 is provided near one of the four mounting bosses 161 which is located at a right front portion of the upper surface 156, and a rear mounting portion 165 is provided near another one of the four mounting bosses 161 which is located at a right rear portion of the upper surface 156.

Front mounting bracket 166 is bolted to the front mounting portion 164 while a rear mounting bracket 167 is bolted to the rear mounting portion 165, so that a power generator 68 is secured to the front and rear brackets 166 and 167 by means of bolts 69.

The left and right motors 112 and 113 (right motor 113 is not shown in FIG. 16) are disposed adjacent to front lower portions of the left and right sides, respectively, of the transmission case 11, and the l left and right crawler belts 29 are driven by the motors 112 and 113. The left and right motors 112 and 113 and electromagnetic clutch 158 are coupled to a control unit 172 (FIGS. 18 and 19) via wiring harnesses 171.

Figure 18:
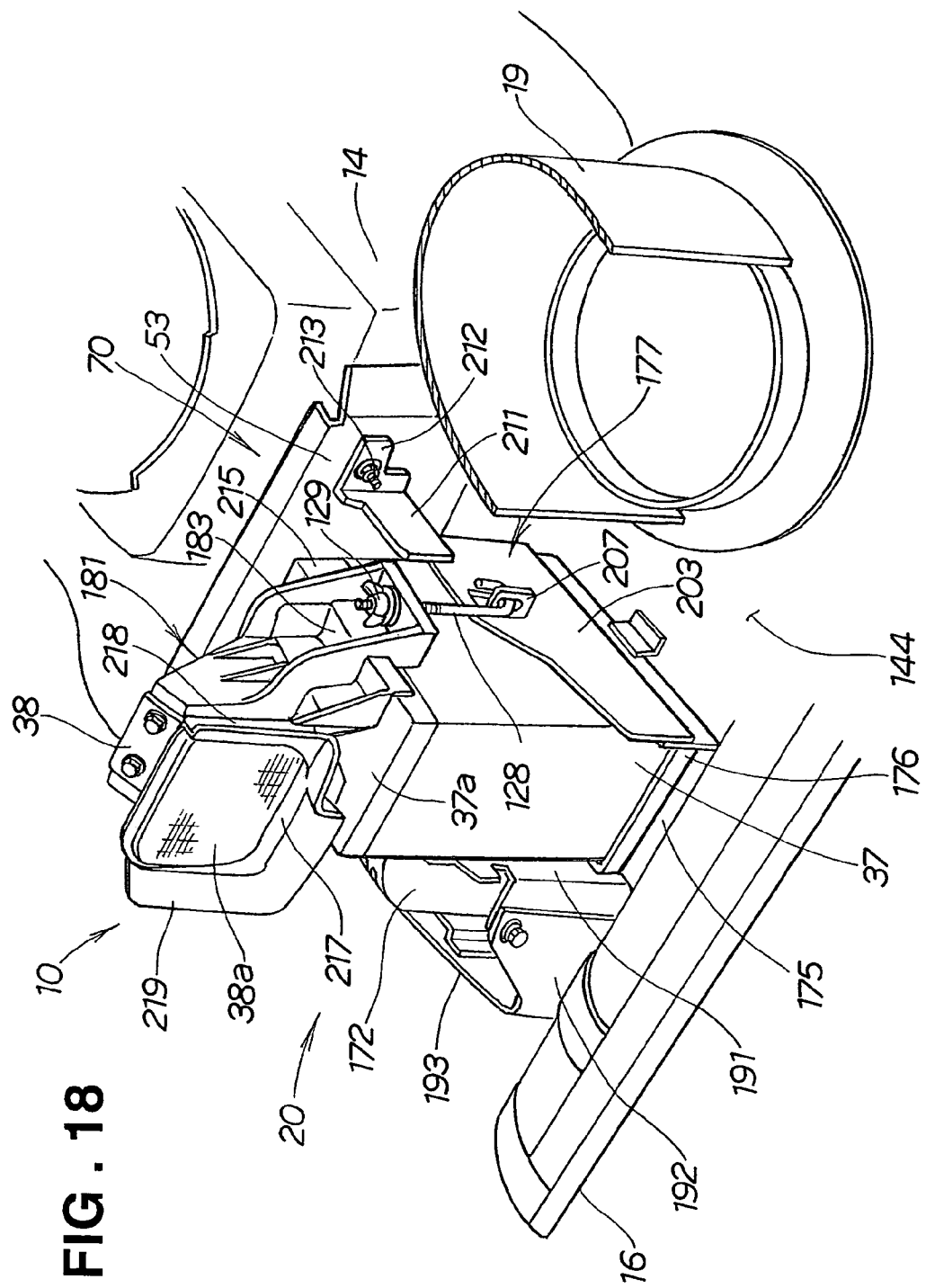
FIG. 18 is a perspective view of the battery support structure.
Figure 19:
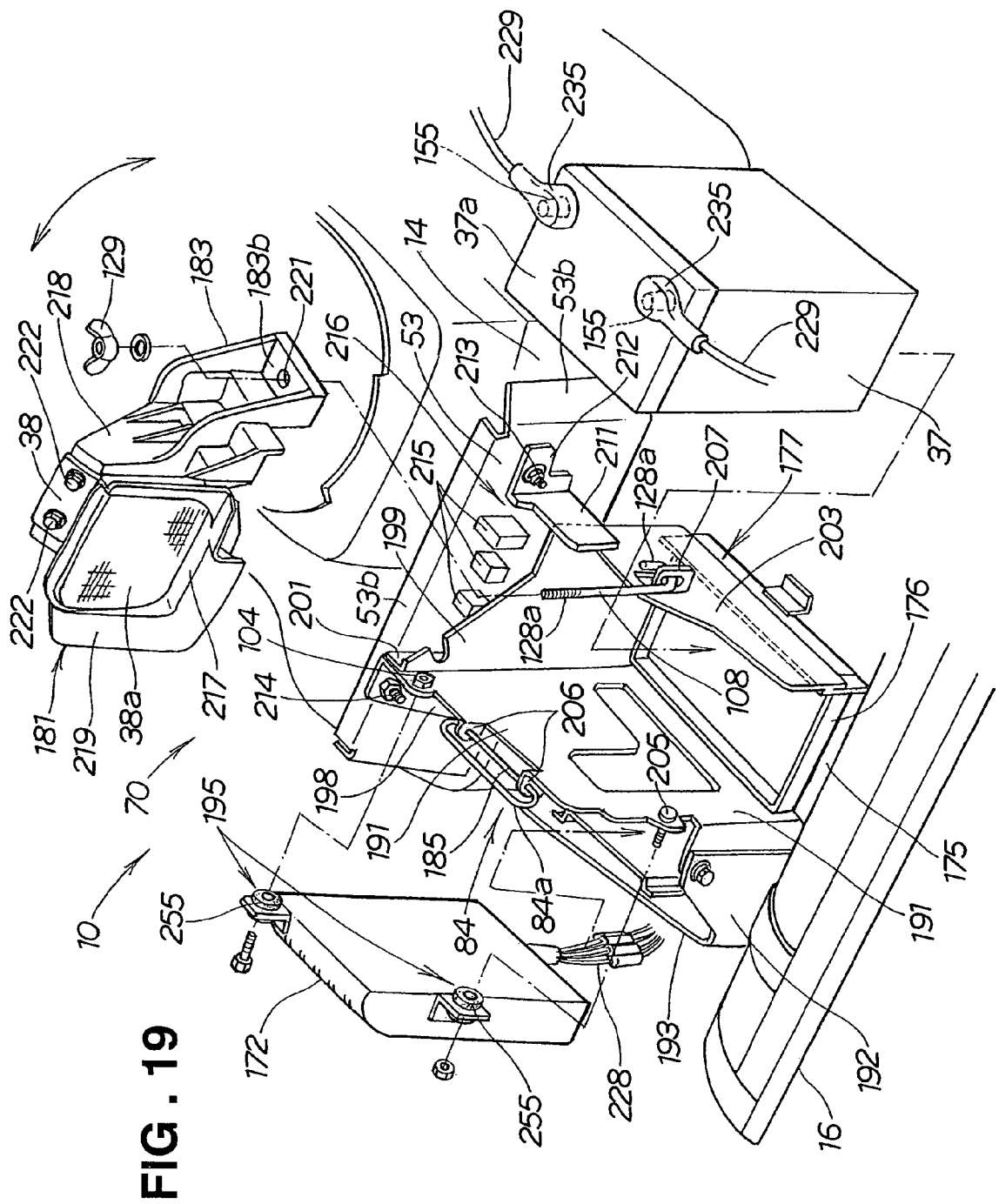
FIG. 19 is an exploded perspective view of the battery support structure.

Namely, the wiring harnesses 171, which are connected to the left and right motors 112 and 113 and electromagnetic clutch 158, extend from a front area of the recesses 157, along a grove 173, forward beyond the transmission case 11. The portion of the wiring harnesses 171 extending forward beyond the transmission case 11 is coupled to the control unit 172 (FIGS. 18 and 19).

Figure 17:
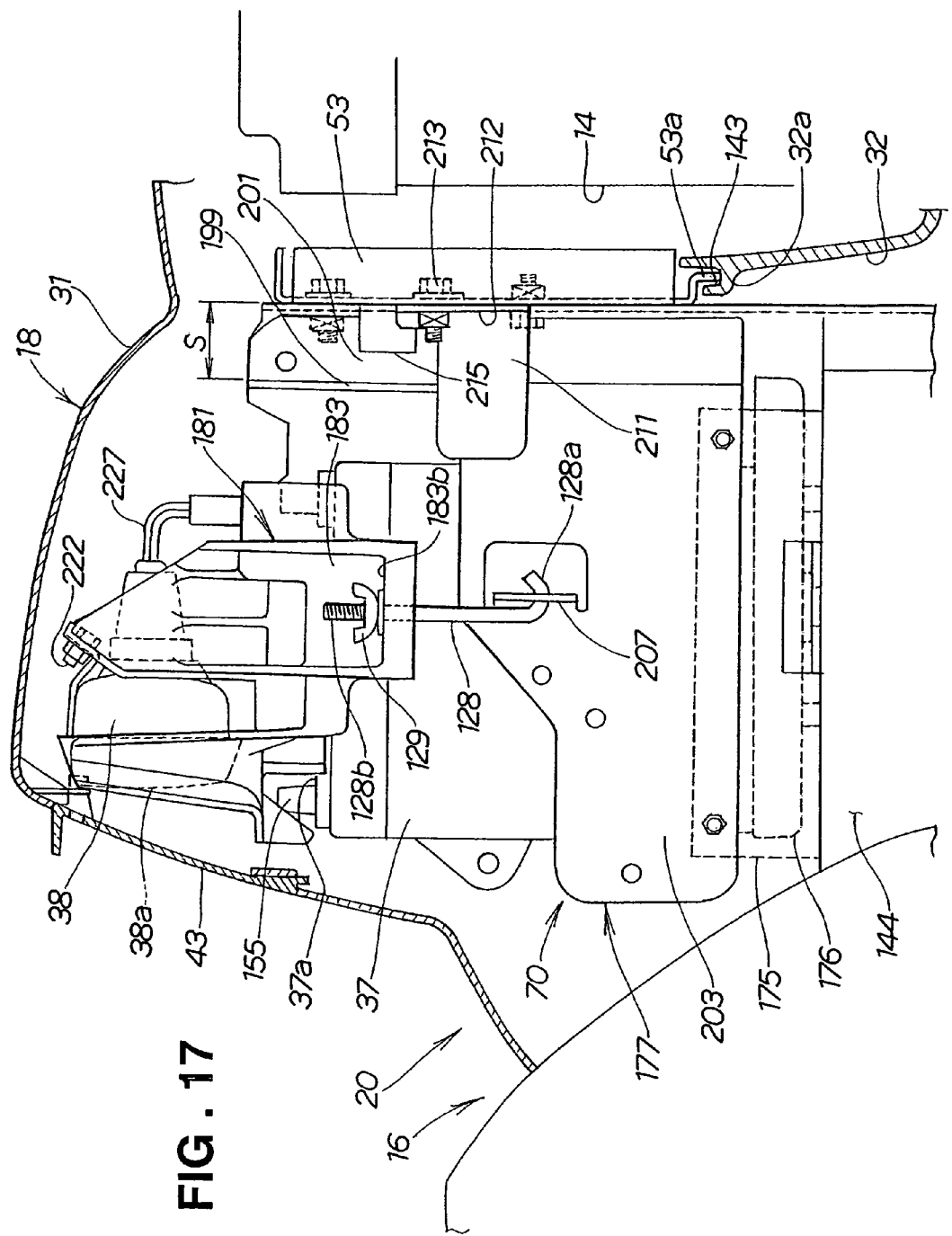
FIG. 17 is a side view of the battery support structure.

FIG. 17 is a side view showing a battery support structure provided in the snow removing machine 10 of FIG. 14. As shown, the snow removing machine 10 includes the battery support structure 70 on the blower housing 144 forming part of the machine body 20. The battery support structure 70 includes a battery holder 177 into which the box-shaped battery 37, having the terminals 155 on its upper surface 37a, can be inserted from above or sideways, and a battery locking member 181 for holding the upper surface 37a of the battery 37 inserted in the battery holder 177. The battery locking member 181 is formed of an insulative resin material.

Now, a detailed description will be given about the battery support structure 70.

Bracket 175 is provided at an upper end of the blower housing 144, and a battery tray 176 and battery holder 177 are attached to the bracket 175. The partition wall 53 is secured to the rear end of the battery holder 177, and it has a downward bent portion 53a inserted in a groove 143 formed in a front upper end edge 32a of the lower cover section 32. Thus, the partition wall 53 is positioned between the battery holder 177 and the engine 14.

The battery 37 is inserted in the battery holder 177 to rest on the battery tray 176, the battery locking member 181 has a right end portion (one end portion) 182 hinged to the battery holder 177 via a hinge rod 185 (FIGS. 19 and 20) and a left end portion (the other end portion) 183 removably coupled to the battery holder 177 via a hook bolt 128 and wing nut 129.

The battery 37 is held in place with its upper surface 37a held by the battery locking member 181, and the battery 37 received in the battery holder 177 is partitioned off from the engine 14 via the partition wall 53. The upper cover section 31 collectively covers the entire battery 37, illumination section 38, engine 14 and partition wall 53.

Conventionally, batteries used in the snow removing machines and other working machines are covered at their upper end portions with cover means. However, in such a case, rain and/or snow having adhered to side wall surfaces of the battery may undesirably enter between the battery and the cover means onto the top of the battery. Therefore, in the present invention, the upper cover section 31 is arranged to cover the entire battery 37 so as to prevent rain and/or snow from entering from side wall surfaces of the battery 37 and thereby reliably protect the battery 37 from rain and/or snow.

Further, in the present invention, the partition wall 53 is provided between the engine 14 and the battery 37 so as to block heat transferred from the engine 14 toward the battery 37. Thus, it is possible to avoid the heat, produced from the engine 14, from adversely influencing the battery 37.

The illumination section 38 is secured to the battery locking member 181 and covered with the upper cover section 31 along with the battery 37. The upper cover section 31 has the light transmitting section 43 facing the front surface 38a of the illumination section 38. Thus, when light is projected from the front surface 38a of the illumination section 38, the projected light passes through the light transmitting section 43 to illuminate an area in front of the snow removing machine 10.

FIG. 18 is a view showing the battery support structure 70 provided in the snow removing machine 10 of the invention. The shooter 19 is disposed adjacent to an upper left side portion of the blower housing 144, the bracket 175 is located rightward of the shooter 19 and forward of the engine 14, and the battery holder 177 of the support structure 70 is attached to the bracket 175; thus, the battery holder 177 is positioned to the left of the shooter 19.

The battery 37 received in the battery holder 177 is partitioned off from the engine 14 via the partition wall 53 secured to the rear end of the battery holder 177.

Guard member 192 is secured to a right wall 191 (see also FIG. 19) of the battery holder 177, and these guard member 192 and right wall 191 together constitute a control unit holder 193.

The locking member 181 of the battery support structure 70 is placed on the battery 37 received in the battery holder 177, and the right end portion (one end portion) 182 (FIG. 20) is hinged to the battery holder 177 via the hinge rod 185 (FIG. 20) while the left end portion (the other end portion) 183 is removably coupled to the battery holder 177 via the hook bolt 128 and wing nut 129. In this way, the battery 37 is locked firmly with its upper surface 37a held by the locking member 181.

The control unit 172 is positioned within the control unit holder 193 and secured to the right wall 191 of the battery holder 177 via vibration absorbing members 195 (FIG. 19). Thus, the battery 37 and control unit 172 are positioned adjacent to the shooter 19 extending from the blower housing 144, and side by side along the width of the transmission case 11 (see FIG. 16).

Reason why the battery 37 and control unit 172 are arranged sequentially adjacent to the shooter 19 is as follows.

Namely, to receive snow thrown up by the blower section 17, the shooter 19 is positioned closer to one side edge (left side edge in the illustrated example) of the blower housing 144. Thus, there would be left a so-called dead space to the right of the shooter 19, i.e. on a right upper surface 196 of the blower housing 144. To make use of the dead space, the battery 37 and control unit 172 employed in the present invention are arranged side by side along the width of the transmission case 11.

The battery 37 stores electric power generated by the power generator 68 (FIG. 16) and supplies the stored power to electric equipment, such as the left and right electric motors 112 and 113 of the traveling unit 13. The left and right electric motors 112 and 113 thus powered by the battery 37 drive the left and right traveling sections 26 (FIG. 14).

The control unit 172 controls the electric equipment, such as the left and right electric motors 112 and 113; for example, the control unit 172 controls power supply to the electric equipment. In this way, driving conditions of the left and right traveling sections 26 can be controlled.

FIG. 19 is an exploded perspective view of the battery support structure 70. The battery holder 177 has the right wall 191 located to the right of the battery 37 and secured to the bracket 175. The right wall 191 has a bent portion 198 at its rear end, and a bent portion 201 of a rear wall 199 (see FIG. 23) is secured to the rear end. The rear wall 199 is spaced a predetermined distance from the partition wall 53 and extends leftward parallel to the partition wall 53. Left end portion of the rear wall 199 is bent forward to form a left wall 203 that extends forward parallel to the right wall 191, and the left and right walls 203 and 191 are connected to the bracket 175. The right wall 191, rear wall 199 and left wall 203 together constitute a wall structure of a generally channel- or U-shape as viewed in top plan.

The right wall 191 has a first part 84a of a hinge section 84 provided on its upper end portion, where a nut 104 and bolt 205 are also provided for securing the control unit 172 to the right wall 191. The first part 84a of the hinge section 84 has a pair of opposed projections 206 extending rightward with a predetermined interval therebetween (FIG. 17), and the hinge rod 185 is inserted through holes formed in the projections 206.

The left wall 203 has a leftward projection 207 having a hole in which the hook bolt 128 is locked. The hook bolt 128 has a lower end portion 128a bent upward to engage with the hole of the projection 207. Upper end portion 128b of the hook bolt 128 has a male thread.

Support member 211 is secured to the left wall 203 of the battery holder 177, and the partition wall 53 is secured to a bent portion 212 of the support member 211 by means of a bolt 213 and to the bent portion 198 of the right wall 191 by means of a bolt 214.

Predetermined interval S left between the partition wall 53 and the rear wall 199 provides a space 216 on the partition wall 53 where are positioned relay switches 215 for the electric equipment driven by the battery 37.

The partition wall 53 is generally in the form of a rectangular plate having rearward bent portions 53b at its upper, left and right sides as well as the above-mentioned downward bent portion 53a (FIG. 17). The bent portions 53b and 53a can provide sufficient rigidity to the partition wall 53 for supporting thereon the relay switches 215.

Further, as illustrated in FIG. 17, the partition wall 53 is supported by the downward bent portion 53a being inserted in the groove 143 of the lower cover section 32. Namely, the lower cover section 32 functions also as a component for supporting the partition wall 53, which can contribute to reduction in the number of the necessary components of the snow removing machine 10 and simplification of assembly of the machine 10.

Besides, because the relay switches 215 for the electric equipment driven by the battery 37 are mounted on the partition wall 53, there is no need to provide a separate component for mounting thereon the relay switches 215. In this way, it is possible to effectively reduce the number of the components of the snow removing machine 10 and the number of the assembly steps.

Furthermore, the battery 37 is held by the locking member 181 being coupled to the battery holder 177. The locking member 181 is a component formed of an insulative resin material, which includes a base 217 supporting thereon the illumination section 38 and left and right supporting portions 218 and 219 on left and right sides of the base 217. The base 217 and left and right supporting portions 218 and 219 together constitute a substantially channel- or U-shaped frame as viewed in top plan, so that the illumination section 38 is positioned in the frame.

As an example, the insulative resin material may be polyphenylene oxide resin, such as "NORYL" (trademark) available from Japan GE Plastics Co.Ltd., although not limited to such polyphenylene oxide resin; however, "NORYL" is very suitable for formation of the locking member 181 in that it can provide preferable mechanical characteristics, such as a superior dimensional stability and low temperature dependency.

The illumination section 38 is secured to the top of the left and right supporting portions 218 and 219 via bolts 222, and the left end portion 183 of the base 217 extends downward and has a mounting hole 221 at its lower end 183b. Second part 84b of the hinge section 84 is provided on the right end portion 182 of the base 217 (FIG. 20).

Figure 20:
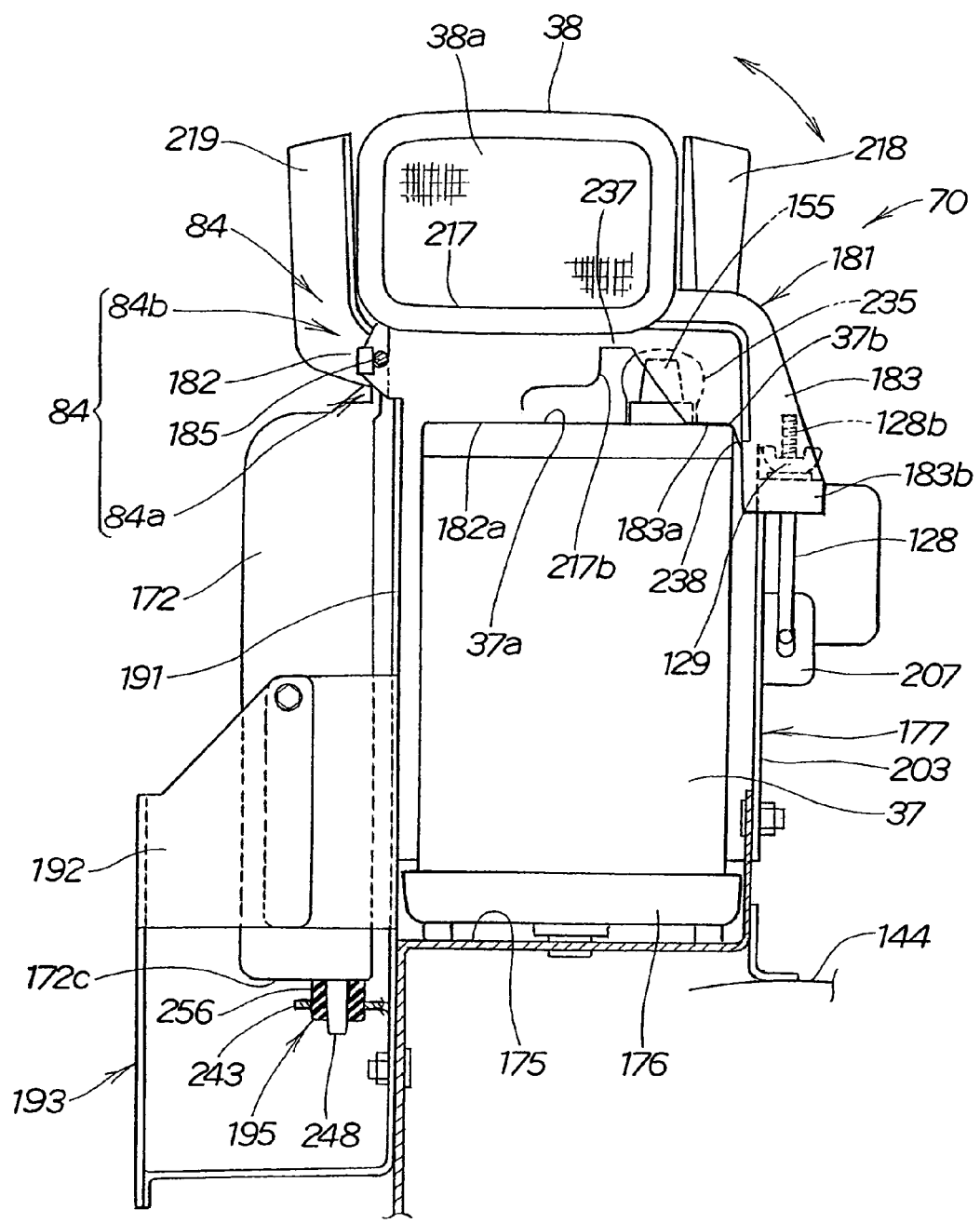
FIG. 20 is a top plan view of the battery support structure.

With the second part 84b of the hinge section 84 rotatably mounted on the hinge rod 185 provided on the battery holder 177, the right end portion 182 of the locking member 181 is mounted on the right wall 191 of the battery holder 177 for pivotal movement in an arrowed direction (see also FIG. 20).

The hook bolt 128 is inserted at its upper end portion 128b through the mounting hole 221 of the left end portion 183, and the wind nut 129 is screwed on the upper end portion 128b projecting beyond the mounting hole 221. Thus, the locking member 181 holds the upper surface 37a of the battery 37 received in the battery holder 177 (see FIGS. 17, 18 and 20).

In the above-described manner, the illumination section 38 is securely mounted on the battery 37 via the locking member 181. Thus, the instant embodiment of the invention can eliminate a need for providing a separate battery holding member and illumination-section holding stay heretofore required in the conventional working machines, thereby reducing the number of the necessary components of the snow removing machine 10; namely, the locking member 181 in the instant embodiment can function as both the battery holding member and the illumination-section holding stay.

Furthermore, with the illumination section 38 mounted immediately above the battery 37 and hence located near the battery 37, an illuminating wiring harness 227 connected to the illumination section 38 can be reduced in length (FIG. 17). Thus, a space for laying the illuminating wiring harness 227 can be secured relatively easily, which contributes to an enhanced design freedom of the snow removing machine 10.

Moreover, with the right end portion 182 of the locking member 181 hinged to the battery holder 177, the human operator can be reliably preventing from inadvertently dropping the locking member 181 when removing the battery 37. In this way, it is possible to avoid damages of the illumination section 38 and illuminating wiring harness 227 connected to the illumination section 38 due to the droppage of the locking member 181.

Figure 23:
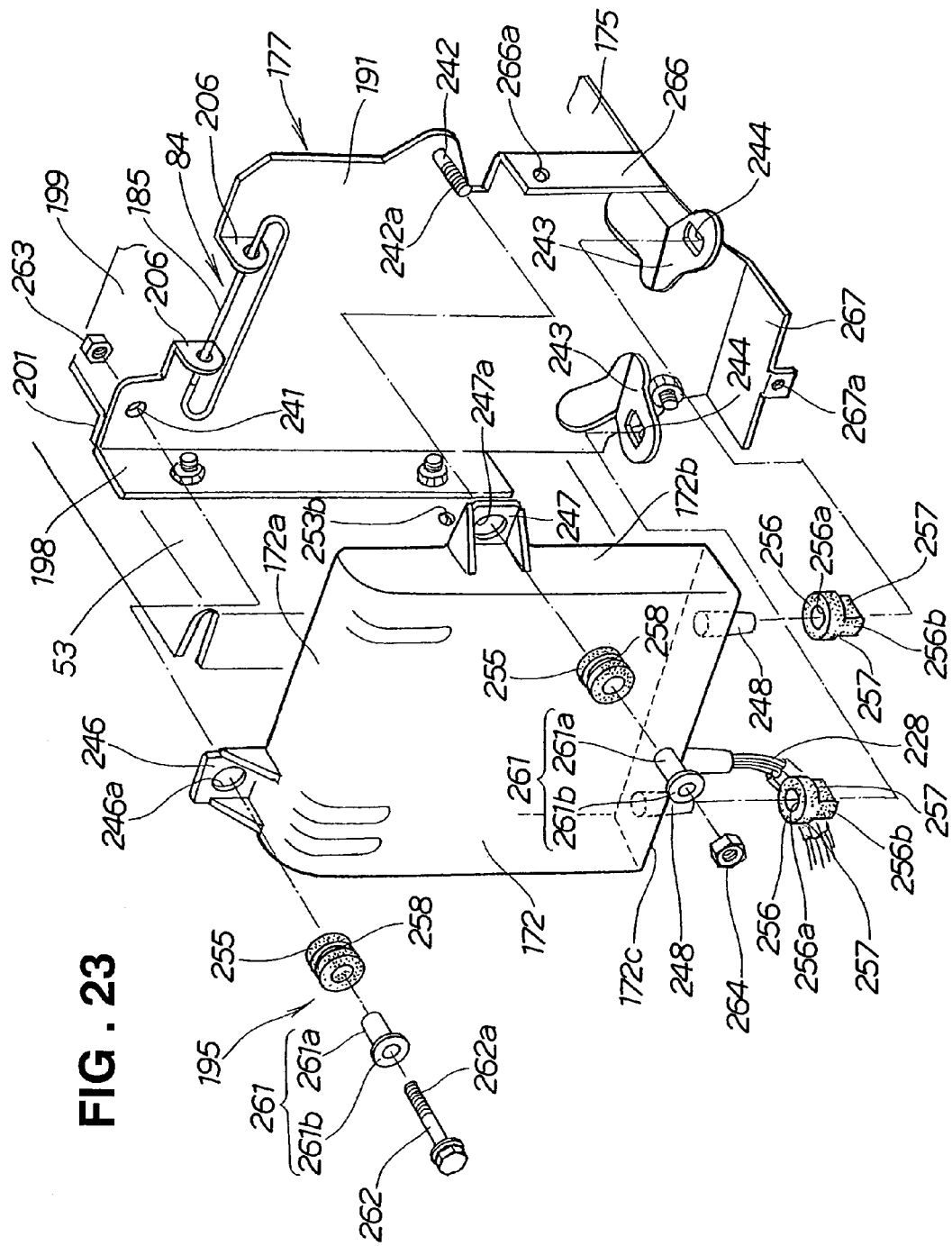
FIG. 23 is a perspective view showing a control unit employed in the snow removing machine of FIG. 14.

The right wall 191 of the battery holder 177 and the guard member 192 secured thereto constitute the control unit holder 193, and the control unit 172 is held in the holder 193 and secured to the right wall 191 via the vibration absorbing members 195 (see also FIG. 23). Because the control unit 172 is positioned near the battery 37 (more specifically near the right side of the battery 37), a wiring harness section 228 for coupling the control unit 172 and battery 37 can be reduced in length. Note that electric wires 229 connected to the terminals 155 of the battery 37 are bundled together by the wiring harness section 228.

The control unit 172, battery 37 and illumination section 38 are positioned adjacent to each other and near the electromagnetic clutch 158, power generator 68 and left and right motors 112 and 113 as seen from FIG. 17. Thus, the wiring harnesses 171 (FIG. 16), 228, electric wires 229, illuminating wiring harness 227 (FIG. 17), etc. can be reduced in length, which facilitates necessary wiring.

FIG. 20 is a top plan view of the battery support structure 70. As seen in FIG. 20, the bracket 175 is provided at the upper end of the blower housing 144, the battery holder 177 is attached to the bracket 175, the battery 37 is held in the battery holder 177, and the battery 37 is held at its upper surface 37a by the battery locking member 181 formed of an insulative resin material.

The right end portion 182 of the battery locking member 181 is hinged to the battery holder 177 via the hinge section 84 while the left end portion 183 is removably coupled to the battery holder 177 via the hook bolt 128 and wing nut 129. Details of the hinge section 84 will be discussed below with reference to FIGS. 21A and 21B.

Figure 21A:
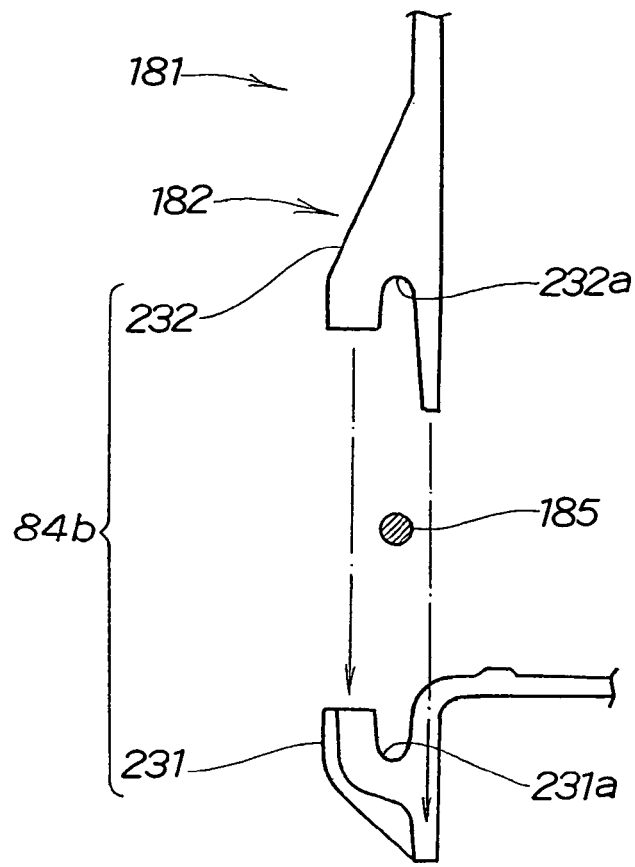
FIGS. 21A and 21B are views explanatory of a hinge section of the battery support structure.
Figure 21B:
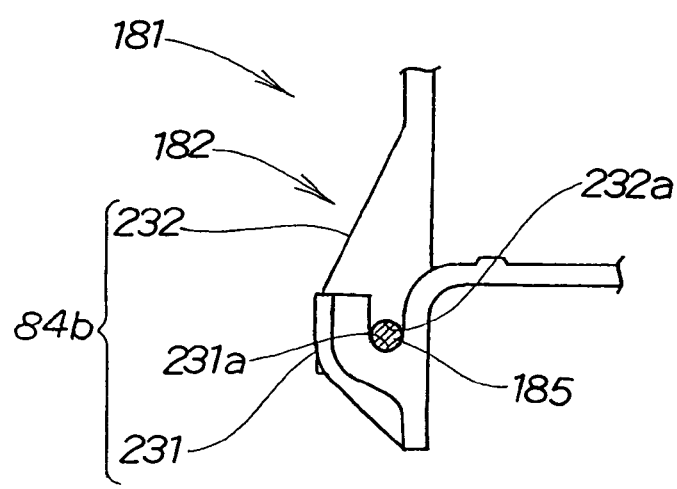

FIGS. 21A and 21B are views explanatory of the hinge section 84 of the battery support structure 70. The second part 84b of the hinge section 84 (see FIG. 20) is provided on the right end portion 182 of the battery locking member 181.

As seen in FIG. 21A, the second part 84b comprises an upward portion 231 having an upwardly-opening groove 231a, and a downward portion 232 having a downwardly-opening groove 232a.

As seen in FIG. 21B, the upward portion 231 and the downward portion 232 are held in abutting engagement with each other so as to rotatably hold the hinge rod 185 in the combined grooves 231a and 232a. Namely, the grooves 231a and 232a combined in this manner can function like an ordinary through-hole. Thus, the combination of the upward and downward portions 231 and 232 can eliminate a need to form a through-hole in the second part 84b, which can simplify a mold etc. for forming the battery locking member 181 and thereby achieve reduced cost.

Figure 22A:
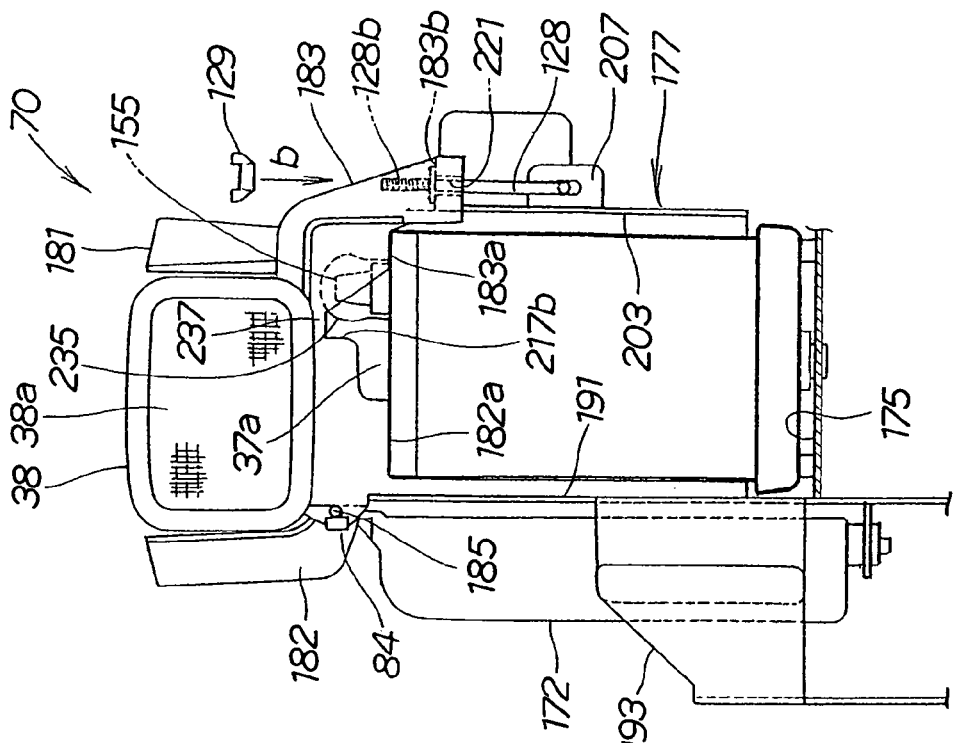
FIGS. 22A and 22B are views explanatory of behavior of the battery support structure.
Figure 22B:
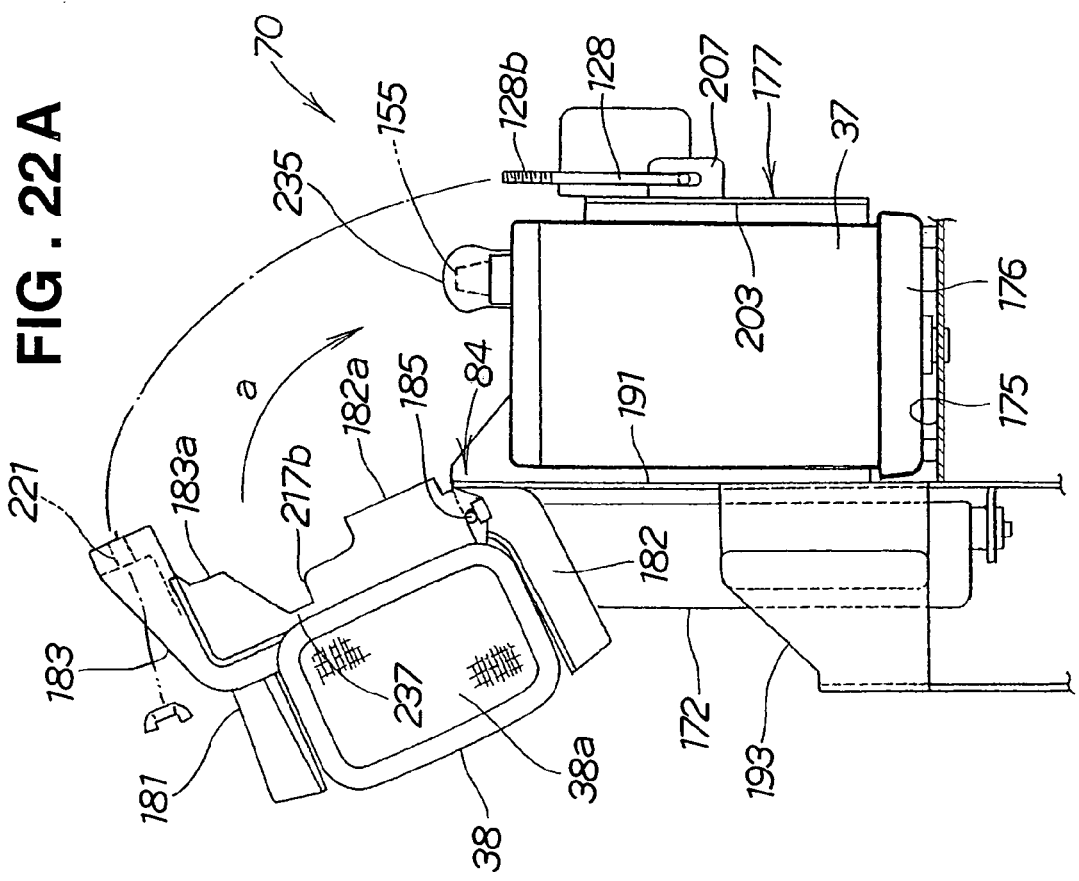

FIGS. 22A and 22B are views explanatory of behavior of the battery support structure 70. As illustrated in FIG. 22A, the battery 37 is inserted in the battery holder 177, for example, from above and placed on the battery tray 176. Then, the battery locking member 181 is caused to pivot about the hinge rod 185 as indicated by arrow "a".

As seen in FIG. 22B, the hook bolt 128 is inserted at its upper end portion 128b through the mounting hole 221 of the left end portion 183 of the battery locking member 181, and the wind nut 129 is set and screwed on the upper end portion 128b projecting beyond the mounting hole 221. Thus, the battery 37 is securely held in battery holder 177 with its upper surface 37a pressed by the battery locking member 181.

Referring back to FIG. 20, the insulative resin material forming the battery locking member 181 can prevent a short circuit when the battery locking member 181 contacts the terminals 155 of the battery 37. Therefore, the mounting position of the battery locking member 181 is not limited by the presence of the battery terminals 155. Further, because of the insulative resin material forming the battery locking member 181, there is no need to form a resin film or coating on the surface of the battery locking member 181.

The terminals 155 of the battery 37 are connected with terminals (not shown) of the corresponding wires 229 (FIG. 19) and covered with respective insulative covers 235. However, it is not preferable to abut any conductive component against the terminals 155, since the insulative covers 235 are intended to merely protect the terminals 155 from dust etc.

If the battery locking member 181 is formed of a conductive material, then there arises a need to mount the locking member 181 away from the terminals 155; namely, the mounting position of the battery locking member 181 is significantly limited by the presence of the battery terminals 155. To avoid the inconvenience, the battery locking member 181 in the instant embodiment is formed of an insulative resin material.

The battery locking member 181 has a resiliently-deformable flexible region 237 at or around a widthwise center (i.e., center in the left-and-right direction) of the base 217. The resiliently-deformable flexible region 237 is preferably provided by forming a recessed portion 217b of a reduced thickness in a central area of the underside of the base 217. Merely forming such a recessed portion 217b can readily provide the resiliently-deformable flexible region 237 and thereby reduce the thickness of the base 217.

By resiliently deforming the flexible region 237, left and right abutting surfaces 183a and 182a formed on the left and right end portions 183 and 182 of the battery locking member 181 can reliably contact the upper surface 37*a* of the battery 37; the left and right abutting surfaces 183*a* and 182*a* form bottom surfaces of the base 217. With the left and right abutting surfaces 183*a* and 182*a* contacting the upper surface 37*a* of the battery 37, the battery locking member 181 can firmly hold the battery 37 with increased reliability.

Further, the right end portion 182 of the battery locking member 181 is hinged to the battery holder 177, while the left end portion 183 is removably coupled to the battery holder 177. Thus, the battery 37 can be removed from the battery holder 177 by only canceling the coupling between the left end portion 183 and the battery holder 177. Further, with the hinge coupling between the right end portion 182 and the battery holder 177, the battery 37 can be removed from the battery holder 177 with the right end portion 182 still kept coupled to the battery holder 177.

Further, the left end portion 183 has the abutting surface 183*a* that abuts against the upper surface 37*a* of the battery 37 when it is coupled with the battery holder 177. Therefore, the abutting surface 183*a* of the left end portion 183 is allowed to abut against the battery upper surface 37*a* without the flexible portion 137 having to be bent more than necessary.

Further, the left end portion 183 has a tapering portion 238 that abuts against an upper corner 37*b* of the battery 37 when the right end portion 182 is coupled with the battery holder 177. Thus, by pressing the tapering portion 238 against the upper corner 37*b* of the battery 37, the battery 37 can be gradually moved toward the right end portion 182 to be eventually positioned at a right location. In this way, an increased tolerance of the battery 37 is permitted, which can contribute to an enhanced usability of the snow removing machine 10.

The following paragraphs describe an example mounting structure of the control unit 172 positioned to the right of the battery 37, with reference to FIGS. 23 to 26.

FIG. 23 is a perspective view showing the control unit 172 of the snow removing machine 10 provided with the battery support structure 70. The control unit 172 is secured to the right wall 191 of the battery holder 177 (see also FIG. 19) via the vibration absorbing members 195 that include upper and lower vibration absorbing members 255 and 256 as will be later described.

For attachment of the control unit 172 to the right wall 191, the right wall 191 has a mounting hole 241 formed near its upper end, a bolt 242 projecting rightward from its front end portion, and a pair of support portions 243 each having an insertion hole 244.

The control unit 172, which has a shape of a generally rectangular box, controls various electric equipment of the snow removing machine 10 where the traveling unit 13 is driven by the left and right motors 112 and 113. The various electric equipment includes the left and right motors 112 and 113, electromagnetic clutch 158, power generator 68, relay switches 215 (FIG. 19), etc.

The control unit 172 has an upper mounting portion 246 projecting upward from its upper end surface 172*a* and having a mounting hole 246*a*. The control unit 172 also has a front mounting portion 247 projecting forward from its front end surface 172*b* and having a mounting hole 247*a*.

Further, the control unit 172 has a pair of projections 248 projecting downward from a lower end surface 172*c* to which the wiring harness section 228 is connected. The lower vibration absorbing members 256 are each of a cylindrical shape and have a pair of front and rear stepped portions, i.e. a pair of front and rear contact surfaces 257.

Each of the lower vibration absorbing members 256 works effectively primarily for vertical vibration. The projections 248 are fitted in through-holes 256*a* of the corresponding lower vibration absorbing members 256, and lower portions 256*b* are fitted in the holes 244 of the support portions 243. In this way, the lower vibration absorbing members 256 are placed on the support portions 243.

Each of the upper vibration absorbing members 255 is of a cylindrical shape having an annular groove 258 formed in its outer peripheral, and it works effectively primarily for horizontal vibration. One of the upper vibration absorbing members 255 is mounted in the mounting hole 246*a* of the corresponding upper mounting portion 246 with the annular groove 258 engaged with the edge of the mounting hole 246*a*. Body portion 261*a* of a collar 261 is inserted in the upper vibration absorbing member 255 with a washer portion 261*b* of the collar 261 abutted against an end surface of the absorbing member 255. Bolt 262 is passed through the collar 261, vibration absorbing member 255 and upper mounting portion 246 in such a manner that a distal end portion 262*a* of the bolt 262 projecting beyond the vibration absorbing member 255 is inserted through the mounting hole 241 of the right wall 191 and screwed into a nut 263.

The other upper vibration absorbing member 255 is attached to the front mounting portion 247 as in the case of the upper mounting portion 246. Namely, the upper vibration absorbing member 255 is mounted in the mounting hole 247*a* of the front mounting portion 247 with the annular groove 258 engaged with the edge of the mounting hole 247*a*. Body portion 261*a* of a collar 261 is inserted in the upper vibration absorbing member 255 with a washer portion 261*b* of the collar 261 abutted against an end surface of the absorbing member 255. The bolt 242 is passed through the collar 261, vibration absorbing member 255 and front mounting portion 247 in such a manner that a distal end portion 242*a* of the bolt 242 projecting beyond the vibration absorbing member 255 is inserted through the mounting portion 247 and screwed into a nut 264.

The wiring harness section 228, connected to the lower end surface 172*c* of the control unit 172, comprises the wiring harnesses 171 bundling together electric wires for the left and right motors 112 and 113 and electromagnetic clutch 158 (FIG. 16), electric wires 229 for the battery 37 (FIG. 19), electric wires 227 for the illumination section 38 (FIG. 19) and electric wires for other electric equipment, such as the relay switches 215.

Figure 24:
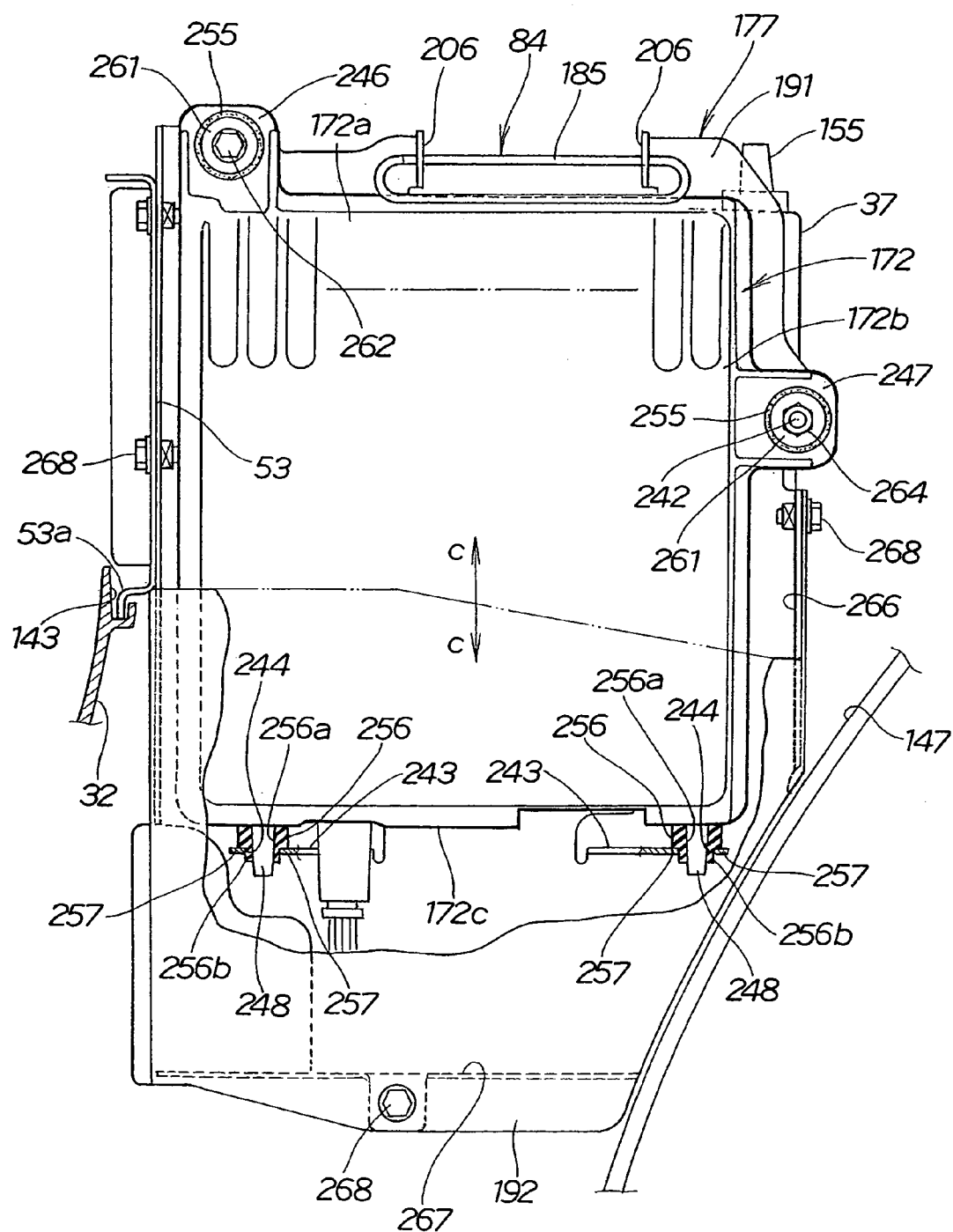
FIG. 24 is a side view showing example details of a control unit employed in the snow removing machine of FIG. 14.

FIG. 24 is a side view showing example details of the control unit 172 employed in the snow removing machine 10. The control unit 172 has the pair of projections 248 projecting from the lower end surface 172*c* and fitted in the through-holes 256*a* of the corresponding lower vibration absorbing members 256. The lower portions 256*b* of the vibration absorbing members 256 are fitted in the holes 244 of the support portions 243 with the front and rear contact surfaces 257 placed on the support portions 243.

The lower vibration absorbing members 256, which are positioned on the lower end surface 172*c* of the control unit 172, work effectively primarily for vertical vibration (in a direction of arrow "c—c") of those vibration acting on the control unit 172. Namely, vertical vibration transferred via the support portions 243 can be absorbed effectively by the lower vibration absorbing members 256 interposed between the lower end surface 172*c* and the support portions 243.

Further, the vibration absorbing members 256, which are interposed between the projections 248 and support portions 243 by being fitted over the projections 248 and fitted in the holes 244 of the support portions 243, can also effectively absorb horizontal vibration transferred via the support portions 243.

Further, the upper mounting portion 246 of the control unit 172 is secured to the right wall 191 of the battery holder 177 by the bolt 262 via the upper vibration absorbing member 255, and the front mounting portion 247 of the control unit 172 is secured to the right wall 191 of the battery holder 177 by the bolt 242 via the other upper vibration absorbing member 255.

The guard member 192 (see also FIG. 19) too is secured to the right wall 191 of the battery holder 177. The guard member 192 is secured to the right wall 191 and partition wall 53 by means of a bolt 268, using a mounting hole 266a formed in a front bent portion 266 of the right wall 191, mounting hole 267a formed in a lower bent portion 267 of the right wall 191 and mounting holes 253b formed in the partition wall 53 (FIG. 23).

The front and rear contact surfaces 257 of the lower vibration absorbing members 256 are placed on the support portions 243 with the projections 248 projecting from the lower end surface 172c and the lower vibration absorbing members 256 fitted over the projections 248 and fitted in the holes 244 of the support portions 243.

Therefore, the control unit 172 can be readily secured to the right wall 191 with no minimized time and labor, by just inserting the vibration absorbing members 256 in the holes 244 of the support portions 243 and then attaching the upper and front mounting portions 246 and 247 of the control unit 172 to the right wall 191 by means of the bolts 262 and 242 via the upper vibration absorbing members 255.

Figure 25:
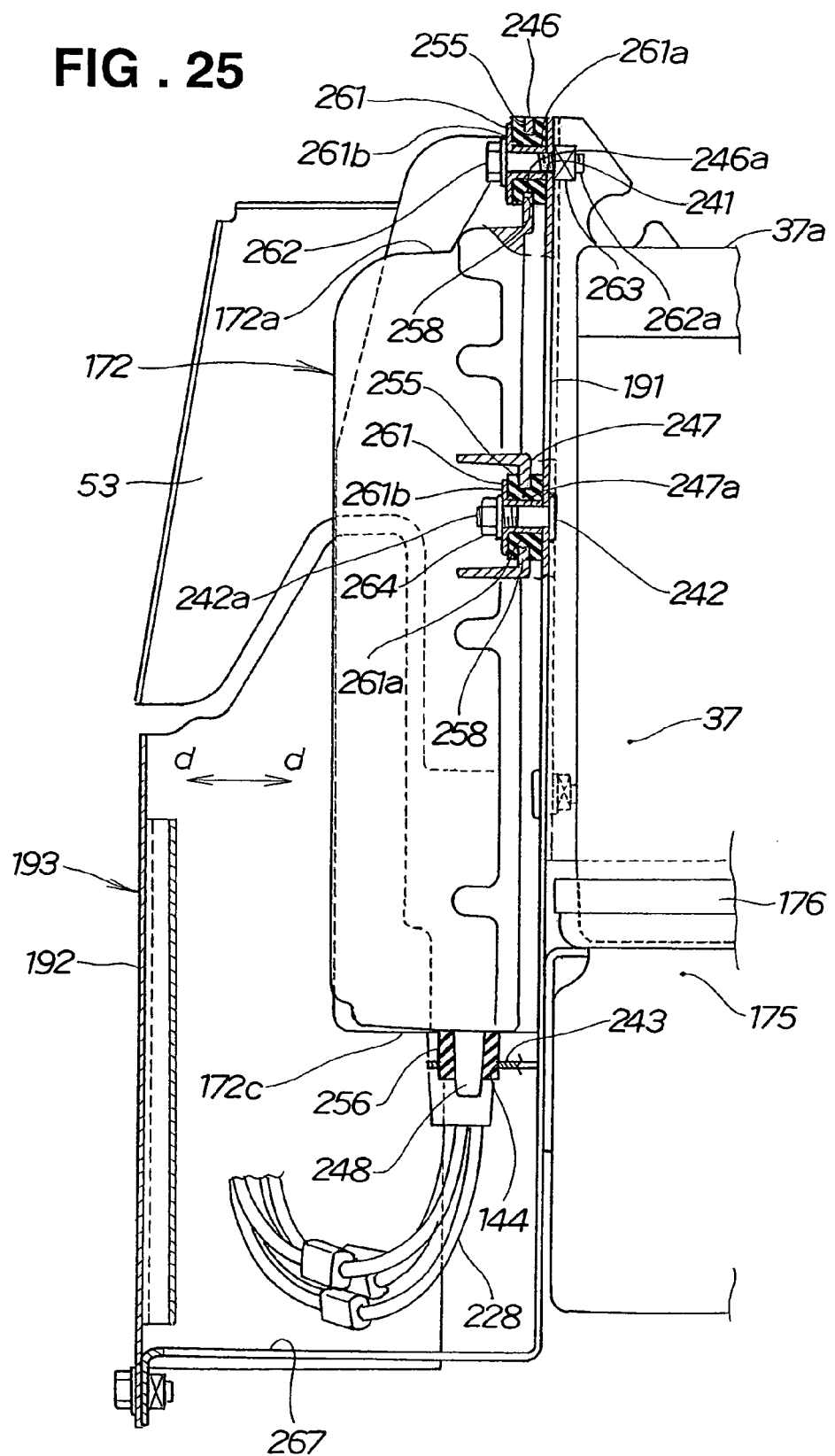
FIG. 25 is a front view of the control unit of the snow removing machine of FIG. 14.

FIG. 25 is a front view of the control unit 172 employed in the snow removing machine 10. As shown, the annular groove 258 of the upper vibration absorbing member 255 is engaged with the edge of the mounting hole 246a formed in the upper mounting portion 246 of the control unit 172, and the body portion 261a of the collar 261 is inserted in the upper vibration absorbing member 255 with the washer portion 261b of the collar 261 abutted against the absorbing member 255. The bolt 262 is passed through the collar 261, vibration absorbing member 255 and upper mounting portion 246, and the distal end portion 262a of the bolt 262 projecting beyond the vibration absorbing member 255 is screwed into the nut 263. In this way, the upper mounting portion 246 of the control unit 172 is secured to the right wall 191 via the vibration absorbing member 255.

The annular groove 258 of the other upper vibration absorbing member 255 is engaged with the edge of the mounting hole 247a formed in the front mounting portion 247 of the control unit 172, and the body portion 261a of the collar 261 is inserted in the vibration absorbing member 255 with the washer portion 261b of the collar 261 abutted against the absorbing member 255. The bolt 242 is passed through the collar 261, vibration absorbing member 255 and front mounting portion 247, and the distal end portion 242a of the bolt 242 projecting beyond the vibration absorbing member 255 is screwed into the nut 264. In this way, the front mounting portion 247 of the control unit 172 is secured to the right wall 191 via the vibration absorbing member 255.

Because the upper mounting portion 246 and front mounting portion 247 of the control unit 172 are secured to the right wall 191 via the upper vibration absorbing members 255, the vibration absorbing members 255 can work effectively primarily for horizontal vibration (in a direction of arrow "d—d") of those vibration acting on the control unit 172.

Namely, the upper mounting portion 246 is fixed indirectly to the right wall 191 and washer portion 261b of the collar 261 via the upper vibration absorbing member 255, so that horizontal vibration transferred via the right wall 191 and washer portion 261b can be absorbed effectively by the upper vibration absorbing member 255. Further, since a part of the upper vibration absorbing member 255 is held between the body portion 261a of the collar 261 and the peripheral edge of the mounting hole 246a of the upper mounting portion 246, it is also possible to absorb vertical vibration transferred from the washer portion 261b of the collar 261.

Similarly, the front mounting portion 247 is fixed indirectly to the right wall 191 and washer portion 261b of the collar 261 via the upper vibration absorbing member 255, so that horizontal vibration transferred via the right wall 191 and washer portion 261b can be absorbed effectively by the upper vibration absorbing member 255. Further, since a part of the upper vibration absorbing member 255 is held between the body portion 261a of the collar 261 and the peripheral edge of the mounting hole 247a of the front mounting portion 246, it is also possible to absorb vertical vibration transferred from the washer portion 261b of the collar 261.

Furthermore, the wiring harness section 228 is surrounded by the guard member 192 and lower bent portion 267 of the right wall 191 and thus can be protected from snow and/or rain.

FIG. 26 is a plan view of the control unit 172 of the snow removing machine 10. The front and rear contact surfaces 257 of the lower vibration absorbing members 256 are placed on the support portions 243, and thus the lower end surface 172c of the control unit 172 are placed on the support portions 243 via the lower vibration absorbing members 256. Thus, the lower vibration absorbing members 256 can work effectively primarily for vertical vibration (in the direction of arrow "c—c") as illustrated in FIG. 24.

The upper mounting portion 246 and front mounting portion 247 of the control unit 172 are secured to the right wall 191 via the upper vibration absorbing members 255, and thus the vibration absorbing members 255 can work effectively primarily for horizontal vibration (in the direction of arrow "d-d"). As a consequence, the upper and lower vibration absorbing members 255 and 256 can attenuate vibration transferred from the transmission case 11 (FIG. 14) to the control unit 172.

Whereas the battery support structure 70 has been described above as applied to the snow removing machine 10, it may be applied to other working machines than the snow removing machine. However, the battery support structure 70 is most suitably applicable to snow removing machines having a battery holder.

Further, whereas the embodiment has been described above in relation to the case where the right end (one end) portion of the battery locking member 181 is hinged to the battery holder 177 while the left end (other end) portion 183 is removably coupled to the battery holder 177, the present invention is not so limited. For example, the right end (one end) portion may be removably coupled to the battery holder 177, and the left end (other end) portion 183 may be is hinged to the battery holder 177.

Furthermore, the shape of the battery locking member 181 may be other than that shown in FIGS. 18–20, as long as the battery locking member 181 can appropriately hold the battery 37 and allows the illumination section 38 to be mounted thereon.

Moreover, whereas the battery holder 177 has been described above as being shaped to allow the battery 37 to be inserted therein from above, it may be of any other shape such that the battery 37 can be inserted therein, for example, sideways, as long as it allows the battery 37 to be accommodated therein and also allows the battery locking member 181 to be attached thereto.

Moreover, although the preferred embodiment of the walk-behind working machine has been described above as embodied as the snow removing machine 10, the present invention is not so limited and may be embodied as other types of walk-behind working machines, such as tilling or cultivating machines. In such a case, the snow removing unit 15 may be replaced with a rotary cultivating unit.

Namely, the present invention can be suitably embodied as various types of walk-behind working machines provided with an illumination section for illuminating an area in front of the machine.

Obviously, various minor changes and modifications of the present invention are possible in the light of the above teaching. It is therefore to be understood that within the scope of the appended claims the invention may be practiced otherwise than as specifically described.

What is claimed is:

1. A walk-behind working machine comprising:
   a traveling unit;
   a working unit;
   an engine;
   an illumination section disposed forwardly of the engine for projecting light; and
   a cover member collectively covering the engine and the illumination section, the cover member having a a light transmitting section for transmitting therethrough light projected by the illumination section, the light transmitting section or a portion of the cover member near the light transmitting section having at least one through-hole through which heat generated by at least one of the engine and the illuminating section is radiated.

2. A walk-behind working machine as claimed in claim 1; further comprising an eave portion extending from the light transmitting section or other portion of the cover member for covering the through-hole to thereby prevent rain water from entering the through-hole.

3. A walk-behind working machine as claimed in claim 2; wherein the eave portion is formed integrally with the light transmitting section of the cover member and extends to a position viewable by a human operator operating the working machine.

4. A walk-behind working machine as claimed in claim 1; wherein the walk-behind working machine comprises a snow removing machine having a machine body, an auger housing and a blower disposed in front of the machine body, and a battery disposed on the blower housing, the illumination section being disposed over the battery.

5. A walk-behind working machine as claimed in claim 4; where the snow removing machine has a battery support structure comprised of a battery holder mounted on an upper portion of the blower housing for receiving the battery, and a battery locking member attached to the battery holder for holding the battery received in the battery holder, the illumination section being mounted on the battery locking member.

6. A walk-behind working machine as claimed in claim 5; wherein the battery locking member is hinged at one end to the battery holder.

7. A walk-behind working machine as claimed in claim 5; wherein the battery holder is configured to receive the battery from a position above or on a side of the battery holder so that the battery locking member holds an upper surface of the battery received in the battery holder; and wherein the battery locking member is formed of an insulative resin material.

8. A walk-behind working machine as claimed in claim 7; wherein the battery locking member has a resiliently-deformable flexible region in or near a middle portion thereof.

9. A walk-behind working machine as claimed in claim 7; wherein the battery locking member has a first end hinged to the battery holder and a second end removably coupled to the battery holder.

10. A walk-behind working machine as claimed in claim 9; wherein the second end of the battery locking member has abutting surfaces abutting against the upper surface of the battery when the second end is coupled to the battery holder.

11. A walk-behind working machine as claimed in claim 9; wherein the second end of the battery locking member has a tapering portion abutting against an upper corner portion of the battery when the second end is coupled to the battery holder.

12. A walk-behind working machine as claimed in claim 4; wherein the battery is disposed in front of the engine and the battery and the engine are covered collectively by the cover member; and further comprising a partition wall disposed between the battery and the engine for blocking heat generated in the engine and directed toward the battery.

13. A walk-behind working machine as claimed in claim 12; further comprising a relay switch for electric equipment driven by the battery, the relay switch being mounted on the partition wall.

14. A walk-behind working machine as claimed in claim 1; wherein the light transmitting section of the cover member is disposed over the illuminating section.

15. A walk-behind working machine as claimed in claim 1; wherein the light transmitting section of the cover member has a lens disposed in front of a front surface of the illumination section for transmitting therethrough light projected by the illumination section.

16. A walk-behind working machine as claimed in claim 1; wherein the light transmitting section has the at least one through-hole.

17. A walk-behind working machine comprising:
   a machine body;
   a traveling unit mounted on the machine body for displacement over a ground surface;
   a working unit mounted on the machine body for performing a work operation on the ground surface;
   an engine for driving the traveling unit and the working unit;
   a battery support structure mounted on the machine body for supporting a battery;
   an illumination section supported by the battery support structure for projecting light from a front surface of the illumination section;
   a light transmitting section disposed over the front surface of the illumination section for transmitting therethrough light projected by the illumination section to illuminate an area in front of the walk-behind working machine; and
   radiating means for radiating heat generated by at least one of the engine and the illumination section.

18. A walk-behind working machine as claimed in claim 17; wherein the radiating means comprises at least one through-hole formed in the light transmitting section.

19. A walk-behind working machine as claimed in claim 17; further comprising a cover member having first and second cover sections covering the engine, the first cover section comprising a cover member having a portion from which a sub-cover portion projects for accommodating therein the illumination section.

20. A walk-behind working machine as claimed in claim 17; wherein the light transmitting section has a lens disposed in front of the front surface of the illumination section for transmitting therethrough light projected by the illumination section to illuminate an area in front of the walk-behind working machine.

* * * * *